United States Patent
Le Henaff

(10) Patent No.: US 8,762,828 B2
(45) Date of Patent: Jun. 24, 2014

(54) TRACING AN ELECTRONIC DOCUMENT IN AN ELECTRONIC PUBLICATION BY MODIFYING THE ELECTRONIC PAGE DESCRIPTION OF THE ELECTRONIC DOCUMENT

(76) Inventor: Guy Le Henaff, Montreal (CA)

( * ) Notice: Subject to any disclaimer, the term of this patent is extended or adjusted under 35 U.S.C. 154(b) by 129 days.

(21) Appl. No.: 13/251,665

(22) Filed: Oct. 3, 2011

(65) Prior Publication Data

US 2013/0080869 A1 Mar. 28, 2013

(51) Int. Cl.
*G06F 17/00* (2006.01)

(52) U.S. Cl.
USPC .......................................................... 715/211

(58) Field of Classification Search
USPC .......................................................... 715/211
See application file for complete search history.

(56) References Cited

U.S. PATENT DOCUMENTS

| | | | |
|---|---|---|---|
| 5,004,869 A | 4/1991 | Koblitz et al. |
| 5,291,243 A | 3/1994 | Heckman et al. |
| 5,436,974 A | 7/1995 | Kovanen |
| 5,444,779 A | 8/1995 | Daniele |
| 5,486,686 A | 1/1996 | Zdybel, Jr. et al. |
| 5,528,742 A | 6/1996 | Moore et al. |
| 5,715,069 A | 2/1998 | Hersee et al. |
| 5,946,414 A | 8/1999 | Cass et al. |
| 6,076,738 A | 6/2000 | Bloomberg et al. |
| 6,341,730 B1 | 1/2002 | Petrie |
| 6,457,657 B1 | 10/2002 | Nielsen |
| 6,614,914 B1 | 9/2003 | Rhoads et al. |
| 6,813,367 B1 | 11/2004 | Bhattacharjya |
| 6,850,931 B2 | 2/2005 | Silverbrook et al. |
| 6,886,863 B1 | 5/2005 | Mowry, Jr. et al. |
| 6,941,460 B2 | 9/2005 | Carro et al. |
| 7,420,692 B2 | 9/2008 | Bourret |
| 7,669,051 B2 | 2/2010 | Redlich et al. |
| 7,765,403 B2 | 7/2010 | Stefik et al. |
| 7,768,513 B2 | 8/2010 | Klassen |
| 7,864,353 B2 | 1/2011 | Choi et al. |
| 7,878,549 B2 | 2/2011 | Simske et al. |
| 7,958,147 B1 | 6/2011 | Turner et al. |
| 8,312,552 B1 * | 11/2012 | Hadden et al. ................. 726/26 |

(Continued)

FOREIGN PATENT DOCUMENTS

WO 2006042460 10/2004

OTHER PUBLICATIONS

"Perceptual Watermarks for Digital Images and Video," Raymond B. Wolfgang et al., IEEE, 1999, pp. 1108-1126.*
"Marking Scanned Documents," Jiri Syrovy, Masaryk University, 2010, pp. iv-59.*
International Searching Authority, "International Search Report", from Foreign Counterpart of U.S. Appl. No. 13/251,665, Jan. 14, 2013, pp. 14, Published in: WO.

*Primary Examiner* — Doug Hutton, Jr.
*Assistant Examiner* — Andrew McIntosh
(74) *Attorney, Agent, or Firm* — Fogg & Powers LLC

(57) ABSTRACT

A system is disclosed which allows for tracing an electronic document within an electronic publication. A message identifier is associated with the electronic document. The message identifier is transformed into a binary format. Drawing instructions are provided in the electronic page description of the electronic document to encode each bit of the binary format as a unique geometrical shape. The plurality of geometrical shapes for all the bits define a mark. The drawing instructions are provided such that the geometrical shapes are invisible and/or overlaid/overlapped. The modified electronic document is then added to the electronic publication. To trace the electronic document, the electronic page description of the electronic publication is sent to an interpreter to extract the geometrical shapes and/or their positions and decode the message identifier.

42 Claims, 19 Drawing Sheets

104

(56) References Cited

U.S. PATENT DOCUMENTS

| | | |
|---|---|---|
| 2003/0152293 A1* | 8/2003 | Bresler et al. ............... 382/305 |
| 2003/0229857 A1 | 12/2003 | Sayuda et al. |
| 2004/0189682 A1 | 9/2004 | Troyansky et al. |
| 2005/0053258 A1* | 3/2005 | Pasqua ......................... 382/100 |
| 2005/0240393 A1 | 10/2005 | Glosson |
| 2006/0242562 A1 | 10/2006 | Wang et al. |
| 2008/0232640 A1* | 9/2008 | Ishizu et al. ................. 382/100 |
| 2009/0138484 A1* | 5/2009 | Ramos et al. ................. 707/10 |
| 2010/0128290 A1 | 5/2010 | Fan et al. |
| 2010/0195866 A1* | 8/2010 | Fisher et al. ................. 382/100 |

* cited by examiner

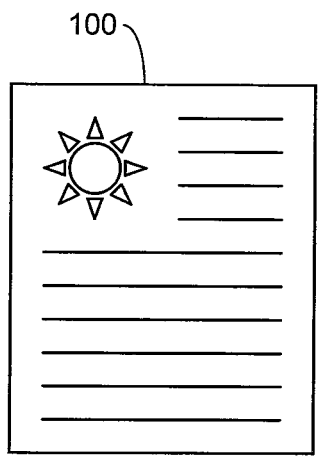
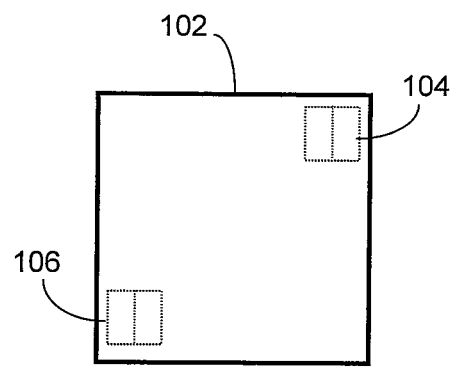
FIGURE 1a
FIGURE 1b
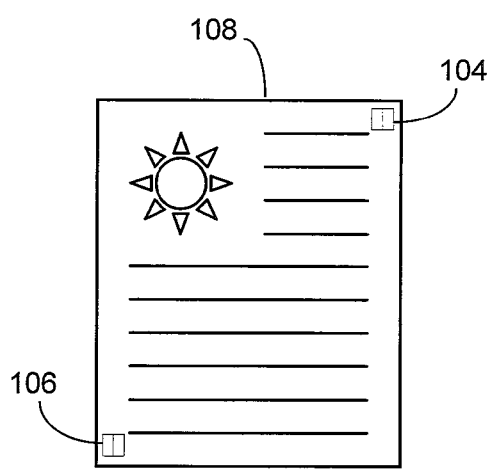
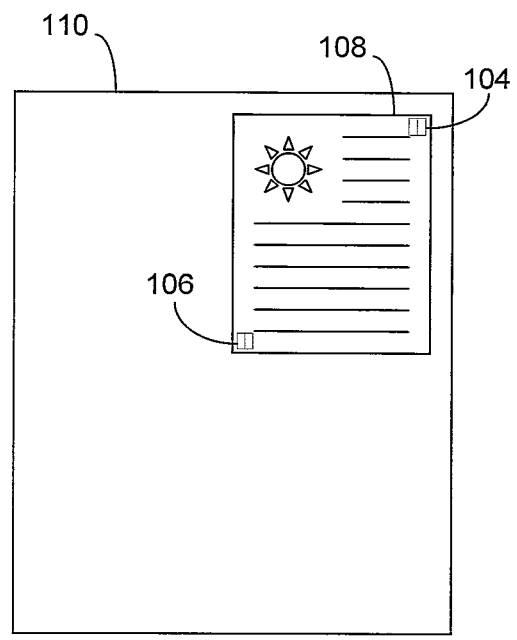
FIGURE 1c
FIGURE 1d

"H' in ASCII code = 01001000

```
%!PS-Adobe-3.0 EPSF-3.0
%%Creator: MarkMagik(EPSOUT)
%%Title: HY0009                    901
%%For: HyMagik
%%CreationDate: 30/ 3/2011  8: 1:47
%%BoundingBox: 0 0 72 72
%%HiResBoundingBox: 0.00 0.00 72.00 72.00    902
%%EndComments
%%EndSetup
/HHDict 20 dict def HHDict begin
/b{bind def} bind def
<<
     /d{def}/m{moveto}/li{lineto} /o{closepath} }
     /u0 {10 0 li 10 10 li }bind        /d0 {0 10 li 0 0 li }bind
     /u1 {5 0 li 5 10 li 10 10 li }bind /d1 {5 10 li 5 0 li 0 0 li }bind   903
>> {b} forall
12 dict begin
   /FontName /HY0009 d /FontType 3 d       /UniqueID 1 d
   /FontMatrix [ 0.0010 0 0 0.0010 0 0 ] d
   /FontBBox [ 0 0 10 10] d /Encoding 256 array d 0 1 255{Encoding exch /.notdef put} for
   3 dict dup /CharProcs exch d
   /.notdef{} d /HY0009{ 0 0 m u1 d0 u0 d0 u0 d1 u0 d0 u1 d0 u1 d0 u0 d1 u1 d0 u1 d0 u1 d0 u0 d0
   u0 d0 u1 d1 u0 d0 u1 d0 u0 d0 u0 d0 u1 d1 u0 d0 u1 d0 u0 d0 u0 d0 u1 d1 u0 d0 u1 d0 u1   904
   d0 u0 d1 u1 d1 u0 d0   o 1 setlinewidth stroke}d /HY0009T{ 0 0 m u1 d0 u0 d0 u0 d1 u0 d0 u1 d0 u1 d0 u1 d0 u0 d1 u1 d0 u1 d0 u1 d0 u0
   d0 u0 d0 u1 d1 u0 d0 u1 d0 u0 d0 u0 d0 u1 d1 u0 d0 u1 d0 u0 d0 u0 d0 u1 d1 u0 d0 u1 d0  905
   u1 d0 u0 d1 u1 d1 u0 d0 u1 d0 u0 d0 u1 d0 u1 d0 u1 d0   o 1 setlinewidth stroke}d
end Encoding ( ) 0 get /HY0009 put
Encoding (\011) 0 get /HY0009T put     906

/BuildGlyph { exch begin
       dup   /.notdef eq    { 0 0 0 0 0 0 setcachedevice}
       {10 0 0 0 10 10 setcachedevice}ifelse
       CharProcs exch get CharProcs begin exec end end
 }b
/BuildChar {
       1 index /Encoding get exch get Encoding exch get1 index /BuildGlyph get exec
 }b
currentdict
end /HY0009 exch definefont   907
pop
end currentoverprint true setoverprint
0 0 0.01 0 setcmykcolor
/HY0009 findfont 10 scalefont setfont   908

0 0 m ( ) show
71.00 71.00 m (\011) show    909

/HY0009 undefinefont setoverprint
end %%HHDict
%%EOF
```

FIGURE 8a

```
<?xml version="1.0" standalone="no"?>
<!DOCTYPE svg PUBLIC "-//W3C//DTD SVG 1.0//EN" "http://www.w3.org/TR/2001/REC-SVG-20010904/
DTD/svg10.dtd" >
<svg width="10px" height="10px" version="1.1" xmlns="http://www.w3.org/2000/svg">
<!-- Creator: MarkMagik(SVGOUT)-->
<!-- Title: HY0009-->
<!-- MarkMagik(SVGOUT)-->
<!-- CreationDate: 30/ 3/2011  8: 1:48-->
<defs >
 <font horiz-adv-x="1" >
        <font-face
              font-family="HY0009C6D2B92857549BBBF558DB42A17D213"   911
              units-per-em="1000"
              panose-1="0 0 2 8 3 0 0 0 0 0"
              ascent="1000"
              descent="0"
              alphabetic="0"
        />
        <missing-glyph horiz-adv-x="0000"/>
        <glyph unicode=" " glyph-name="space" horiz-adv-x="1000"   912
              d="H500V1000H1000V0H0V1000H1000V0V1000H1000V0H0H500V1000H1000
              V0H0H500V1000H1000V0H0H500V1000H1000V0H0V1000H1000V0H0H500V1000H1000V0H0H500V
              1000H1000V0H0H500V1000H1000V0H0V1000H1000V0H0V1000H1000V0H0H500V1000H1000H0V0
              V1000H1000V0H0H500V1000H1000V0H0V1000H1000V0H0V1000H1000V0H0H500V1000H1000H0V
              0V1000H1000V0H0H500V1000H1000V0H0V1000H1000V0H0V1000H1000V0H0H500V1000H1000H0
              V0V1000H1000V0H0H500V1000H1000V0H0H500V1000H1000V0H0V1000H1000H0V0H500V1000H1
              000H0V0V1000H1000V0H0Z"
        />
        <glyph unicode="	" glyph-name="tab" horiz-adv-x="1000"   913
              d="H500V1000H1000V0H0V1000H1000V0H0V1000H1000V0H0H500V1000H1000
              V0H0H500V1000H1000V0H0H500V1000H1000V0H0V1000H1000V0H0H500V1000H1000V0H0H500V
              1000H1000V0H0H500V1000H1000V0H0V1000H1000V0H0V1000H1000V0H0H500V1000H1000H0V0
              V1000H1000V0H0H500V1000H1000V0H0V1000H1000V0H0V1000H1000V0H0H500V1000H1000H0V
              0V1000H1000V0H0H500V1000H1000V0H0V1000H1000V0H0V1000H1000V0H0H500V1000H1000H0
              V0V1000H1000V0H0H500V1000H1000V0H0H500V1000H1000V0H0V1000H1000H0V0H500V1000H1
              000H0V0V1000H1000V0H0H500V1000H1000V0H0H500V1000H1000V0H0H500V1000H1000V0H0V1
              000H1000V0H0H500V1000H1000V0H0Z"
        />
 </font>
</defs>
<text x="0" y="0" style="font-family: 'HY0009C6D2B92857549BBBF558DB42A17D213', Helvetica,
sans-serif;
              font-weight: 100; font-style: normal"   914
 > </text>
<text x="9" y="9" style="font-family: 'HY0009C6D2B92857549BBBF558DB42A17D213', Helvetica,
sans-serif;
              font-weight: 100; font-style: normal"   915
 >	</text>
</svg>
```

FIGURE 8b

```
@font-face {
    font-family: "HY0009C6D2B92857549BBBF558DB42A17D213";
    src: url("http://site/markmagikgylphs/HY0009C6D2B92857549BBBF558DB42A17D213.prf")   /*
    HY0009C6D2B92857549BBBF558DB42A17D213 */
    font-style: normal;
    font-weight: 100;
}
```

```xml
<?xml version="1.0" encoding="UTF-8" standalone="yes" ?>
<skano>
    <start>
        <time>110455954</time>
        <lib>0.9.0.9</lib>
        <version>1.0.0.1</version>
        <xmlpathname>C:/Temp/Marko/docs/xml/Publication_21384.xml</xmlpathname>
        <docsize>[0 0 612.0 792.0 ]</docsize>
        <pspathname>./docs/tmp/Publication_21384.PS</pspathname>
        <doc>Publication_21384</doc>
    </start>
    <showpage>
        <pagecounter>1</pagecounter>
        <runcount>116</runcount>
        <docsize>[0 0 612 792 ]</docsize>        1001
    </showpage>
    <show>                                                                          1002
        <glyp>0.0 0 mo 0.25 0 li 0.25 -0.5 li 0.5 -0.5 li 0.0 -0.5 li 0.0 0 li 0.5 0
li 0.5 -0.5 li 0.0 -0.5 li 0.0 0 li 0.5 0 li 0.5 -0.5 li 0.25 -0.5 li 0.25 0 li 0.0 0 li
0.5 0 li 0.5 -0.5 li 0.0 -0.5 li 0.0 0 li 0.25 0 li 0.25 -0.5 li 0.5 -0.5 li 0.0 -0.5 li
0.0 0 li 0.25 0 li 0.25 -0.5 li 0.5 -0.5 li 0.0 -0.5 li 0.0 0 li 0.25 0 li 0.25 -0.5 li
0.5 -0.5 li 0.0 -0.5 li 0.0 0 li 0.5 0 li 0.5 -0.5 li 0.25 -0.5 li 0.25 0 li 0.0 0 li 0.25
0 li 0.25 -0.5 li 0.5 -0.5 li 0.0 -0.5 li 0.0 0 li 0.25 0 li 0.25 -0.5 li 0.5 -0.5 li 0.0
-0.5 li 0.0 0 li 0.25 0 li 0.25 -0.5 li 0.5 -0.5 li 0.0 -0.5 li 0.0 0 li 0.5 0 li 0.5 -0.5
li 0.0 -0.5 li 0.0 0 li 0.5 0 li 0.5 -0.5 li 0.0 -0.5 li 0.0 0 li 0.25 0 li 0.25 -0.5 li
0.5 -0.5 li 0.25 -0.5 li 0.25 0 li 0.0 0 li 0.5 0 li 0.5 -0.5 li 0.0 -0.5 li 0.0 0 li 0.25
0 li 0.25 -0.5 li 0.5 -0.5 li 0.0 -0.5 li 0.0 0 li 0.25 0 li 0.25 -0.5 li 0.5 -0.5 li 0.0
-0.5 li 0.0 0 li 0.25 0 li 0.25 -0.5 li 0.5 -0.5 li 0.0 -0.5 li 0.0 0 li 0.25 0 li 0.25 -
0.5 li 0.5 -0.5 li 0.25 -0.5 li 0.25 0 li 0.0 0 li 0.5 0 li 0.5 -0.5 li 0.0 -0.5 li 0.0 0
li 0.25 0 li 0.25 -0.5 li 0.5 -0.5 li 0.0 -0.5 li 0.0 0 li 0.5 0 li 0.5 -0.5 li 0.0 -0.5
li 0.0 0 li 0.25 0 li 0.25 -0.5 li 0.5 -0.5 li 0.0 -0.5 li 0.0 0 li 0.25 0 li 0.25 -0.5 li
0.5 -0.5 li 0.25 -0.5 li 0.25 0 li 0.0 0 li 0.5 0 li 0.5 -0.5 li 0.0 -0.5 li 0.0 0 li 0.25
0 li 0.25 -0.5 li 0.5 -0.5 li 0.0 -0.5 li 0.0 0 li 0.25 0 li 0.25 -0.5 li 0.5 -0.5 li 0.0
-0.5 li 0.0 0 li 0.5 0 li 0.5 -0.5 li 0.0 -0.5 li 0.0 0 li 0.25 0 li 0.25 -0.5 li 0.5 -0.5
li 0.25 -0.5 li 0.25 0 li 0.0 0 li 0.5 0 li 0.5 -0.5 li 0.0 -0.5 li 0.0 0 li 0.25 0 li
0.25 -0.5 li 0.5 -0.5 li 0.0 -0.5 li 0.0 0 li 0.25 0 li 0.25 -0.5 li 0.5 -0.5 li 0.0 -0.5
li 0.0 0 li 0.25 0 li 0.25 -0.5 li 0.5 -0.5 li 0.0 -0.5 li 0.0 0 li 0.25 0 li 0.25 -0.5 li
0.5 -0.5 li 0.25 -0.5 li 0.25 0 li 0.0 0 li 0.5 0 li 0.5 -0.5 li 0.25 -0.5 li 0.25
0 li 0.0 0 li 0.25 0 li 0.25 -0.5 li 0.5 -0.5 li 0.0 -0.5 li 0.0 0 li 0.25 0 li 0.25 -0.5
li 0.5 -0.5 li 0.25 -0.5 li 0.25 0 li 0.0 0 li 0.5 0 li 0.5 -0.5 li 0.0 0 0 li
0.25 0 li 0.25 -0.5 li 0.5 -0.5 li 0.0 -0.5 li 0.0 0 li 0.25 0 li 0.25 -0.5 li 0.5 -0.5 li
0.25 -0.5 li 0.25 0 li 0.0 0 li 0.25 0 li 0.25 -0.5 li 0.5 -0.5 li 0.0 -0.5 li 0.0 0 li
0.25 0 li 0.25 -0.5 li 0.5 -0.5 li 0.25 -0.5 li 0.25 0 li 0.0 0 li 0.5 0 li 0.5 -0.5 li
0.0 -0.5 li 0.0 0 li 0.25 0 li 0.25 -0.5 li 0.5 -0.5 li 0.0 -0.5 li 0.0 0 li 0.25 0 li
0.25 -0.5 li 0.5 -0.5 li 0.25 -0.5 li 0.25 0 li 0.0 0 li 0.25 0 li 0.25 -0.5 li 0.5 -0.5
li 0.0 -0.5 li 0.0 0 li 0.25 0 li 0.25 -0.5 li 0.5 -0.5 li 0.25 -0.5 li 0.25 0 li 0.0 0 li
0.5 0 li 0.5 -0.5 li 0.0 -0.5 li 0.0 0 li 0.25 0 li 0.25 -0.5 li 0.5 -0.5 li 0.0 -0.5 li
0.0 0 li 0.5 0 li 0.5 -0.5 li 0.25 -0.5 li 0.25 0 li 0.0 0 li 0.25 0 li 0.25 -0.5 li 0.5 -
0.5 li 0.0 -0.5 li 0.0 0 li 0.25 0 li 0.25 -0.5 li 0.5 -0.5 li 0.25 -0.5 li 0.25 0 li 0.0
0 li 0.5 0 li 0.5 -0.5 li 0.0 -0.5 li 0.0 0 li 0.25 0 li 0.25 -0.5 li 0.5 -0.5 li 0.0 -0.5
li 0.0 0 li 0.5 0 li 0.5 -0.5 li 0.0 -0.5 li 0.0 0 li 0.25 0 li 0.25 -0.5 li 0.5 -0.5 li
0.0 -0.5 li 0.0 0 li 0.5 0 li 0.5 closepath</glyp>
        <pos>[13.6 108 ]</pos>
        <fontglyph>false</fontglyph>        1003
        <order>0</order>
    </show>
```

FIGURE 9a

```
<show>
        <glyp>1 0 0 0 1 1 Xc 0.1 Xl 0 Xlc 0 Xslj 10 Xslm [ ] 0 Xd /true
setstrokeadjust 0 0 /mo 0.5 0 /li 0.5 1 /li 1 1 /li 0 1 /li 0 0 /li 1 0 /li 1 1 /li 0
1 /li 0 0 /li 1 0 /li 1 1 /li 0.5 1 /li 0.5 0 /li 0 0 /li 1 0 /li 1 1 /li 0 1 /li 0
0 /li 0.5 0 /li 0.5 1 /li 1 1 /li 0 1 /li 0 0 /li 0.5 0 /li 0.5 1 /li 1 1 /li 0 1 /li
0 0 /li 0.5 0 /li 0.5 1 /li 1 1 /li 0 1 /li 0 0 /li 1 0 /li 1 1 /li 0.5 1 /li 0.5 0 /
li 0 0 /li 0.5 0 /li 0.5 1 /li 1 1 /li 0 1 /li 0 0 /li 0.5 0 /li 0.5 1 /li 1 1 /li 0
1 /li 0 0 /li 0.5 0 /li 0.5 1 /li 1 1 /li 0 1 /li 0 0 /li 0.5 0 /li 0.5 1 /li 1 1 /li
0 1 /li 0 0 /li 1 0 /li 1 1 /li 0 1 /li 0 0 /li 0.5 0 /li 0.5 1 /li 1 1 /li 0.5 1 /li
0.5 0 /li 0 0 /li 1 0 /li 1 1 /li 0 1 /li 0 0 /li 0.5 0 /li 0.5 1 /li 1 1 /li 0 1 /li
0 0 /li 1 0 /li 1 1 /li 0 1 /li 0 0 /li 1 0 /li 1 1 /li 0 1 /li 0 0 /li 0.5 0 /li 0.5
1 /li 1 1 /li 0.5 1 /li 0.5 0 /li 0 0 /li 1 0 /li 1 1 /li 0 1 /li 0 0 /li 0.5 0 /li
0.5 1 /li 1 1 /li 0 1 /li 0 0 /li 1 0 /li 1 1 /li 0 1 /li 0 0 /li 1 0 /li 1 1 /li 0
1 /li 0 0 /li 0.5 0 /li 0.5 1 /li 1 1 /li 0.5 1 /li 0.5 0 /li 0 0 /li 1 0 /li 1 1 /li
0 1 /li 0 0 /li 0.5 0 /li 0.5 1 /li 1 1 /li 0 1 /li 0 0 /li 1 0 /li 1 1 /li 0 1 /li 0
0 /li 0.5 0 /li 0.5 1 /li 1 1 /li 0 1 /li 0 0 /li 0.5 0 /li 0.5 1 /li 1 1 /li 0.5 1 /
li 0.5 0 /li 0 0 /li 1 0 /li 1 1 /li 0 1 /li 0 0 /li 0.5 0 /li 0.5 1 /li 1 1 /li 0
1 /li 0 0 /li 0.5 0 /li 0.5 1 /li 1 1 /li 0 1 /li 0 0 /li 1 0 /li 1 1 /li 0 1 /li 0
0 /li 0.5 0 /li 0.5 1 /li 1 1 /li 0.5 1 /li 0.5 0 /li 0 0 /li 1 0 /li 1 1 /li 0 1 /li
0 0 /li 0.5 0 /li 0.5 1 /li 1 1 /li 0 1 /li 0 0 /li 0.5 0 /li 0.5 1 /li 1 1 /li 0 1 /
li 0 0 /li 0.5 0 /li 0.5 1 /li 1 1 /li 0 1 /li 0 0 /li 0.5 0 /li 0.5 1 /li 1 1 /li
0.5 1 /li 0.5 0 /li 0 0 /li 1 0 /li 1 1 /li 0 1 /li 0 0 /li 0.5 0 /li 0.5 1 /li 1 1 /
li 0 1 /li 0 0 /li 1 0 /li 1 1 /li 0.5 1 /li 0.5 0 /li 0 0 /li 0.5 0 /li 0.5 1 /li 1
1 /li 0 1 /li 0 0 /li 0.5 0 /li 0.5 1 /li 1 1 /li 0.5 1 /li 0.5 0 /li 0 0 /li 1 0 /li
1 1 /li 0 1 /li 0 0 /li 0.5 0 /li 0.5 1 /li 1 1 /li 0 1 /li 0 0 /li 0.5 0 /li 0.5 1 /
li 1 1 /li 0.5 1 /li 0.5 0 /li 0 0 /li 0.5 0 /li 0.5 1 /li 1 1 /li 0 1 /li 0 0 /li
0.5 0 /li 0.5 1 /li 1 1 /li 0.5 1 /li 0.5 0 /li 0 0 /li 1 0 /li 1 1 /li 0 1 /li 0 0 /
li 0.5 0 /li 0.5 1 /li 1 1 /li 0 1 /li 0 0 /li 0.5 0 /li 0.5 1 /li 1 1 /li 0.5 1 /li
0.5 0 /li 0 0 /li 0.5 0 /li 0.5 1 /li 1 1 /li 0 1 /li 0 0 /li 0.5 0 /li 0.5 1 /li 1
1 /li 0.5 1 /li 0.5 0 /li 0 0 /li 1 0 /li 1 1 /li 0 1 /li 0 0 /li 0.5 0 /li 0.5 1 /li
1 1 /li 0 1 /li 0 0 /li 0.5 0 /li 0.5 1 /li 1 1 /li 0.5 0 /li 0 0 /li 0.5 1 /
li 1 1 /li 0 1 /li 0 0 /li 0.5 0 /li 0.5 1 /li 1 1 /li 0.5 1 /li 0.5 0 /li 0 0 /li 1
0 /li 1 1 /li 0 1 /li 0 0 /li 0.5 0 /li 0.5 1 /li 1 1 /li 0 1 /li 0 0 /li 1 0 /li 1
1 /li 0 1 /li 0 0 /li 0.5 0 /li 0.5 1 /li 1 1 /li 0 1 /li 0 0 /li 0.5 0 /li 0.5 1 /li
1 1 /li 0 1 /li 0 0 /li 0.5 0 /li 0.5 1 /li 1 1 /li 0 1 /li 0 0 /li /done</glyp>
        <key>/HY1004156776T</key>
        <fontglyph>true</fontglyph>
        <pos>[412.8 708.0 ]</pos>        1004
        <order>1</order>
    </show>
    <closing>
        <time>110457384</time>
    </closing>
</skano>
```

FIGURE 9b

TRACING AN ELECTRONIC DOCUMENT IN AN ELECTRONIC PUBLICATION BY MODIFYING THE ELECTRONIC PAGE DESCRIPTION OF THE ELECTRONIC DOCUMENT

BACKGROUND

1. Field

The subject matter disclosed generally relates to the publishing industry. In particular, the subject matter relates to a system and method for tracing a document in a publication.

2. Related Prior Art

Adding a mark to qualify a document a book or a publication is a very old issue. The title of books can be qualified as a mark. It is not part of the content but it is a key component of the work to identify and retrieve it. The electronic indexation version of this method uses a similar principle. Typically, the ISBN (International Standard Book Number) allows for a unique referencing which is compatible with automation tracking and non-contact method of recognition like a barcode.

But while theses limited solutions exist at a publication level e.g. book, magazine etc., there is still no solution of that sort internal to the publication.

One of the areas that require internal tracking of documents within publications is the publishing and advertisement industry where every publication is usually made of several pieces of communication coming from various sources such as articles, ads, photos etc. The authors or sponsors of these articles/ads need to know how their pieces of communication are being handled. For example, the authors need to know if their publications/ads/documents were published with the right size, font, x/y ratio, position in the page, etc. so they can pay the invoice of the publisher.

Another example includes companies which require internal referencing and tracking of their ads and documents e.g. tracking a magazine, an ad, a flyer, a legal document, schematics, plans etc. within a company.

Theses publishing processes involves editing software made from various manufacturers. Nearly all of these softwares allow to store Meta-information aimed at qualifying the content without being part of it. To address the issues discussed above, publication artists (technicians) increase their use of Meta-Information imbedded in the document.

Even is some Meta-Information standard exist, JDF, XMP, DCM, and initiative to encourage its use, software vendors, service companies, distributors, publisher, printers, web publisher, work in a very segmented way, all see needs for their own extension. This leads to the creation of many redundant schema of Meta information without real bridge between them. Also, Meta information embedded in the document are prone to many alteration change and deterioration, either because one of the processes along the publishing chain does not recognize the Meta information, or because the information is not updated or not gathered it the final document.

Therefore, the life expectancy of Meta information is practically very short and they are frequently removed by processing software, either purposely or because they are unknown, or considered as unreliable or inappropriate.

Also the syndication of contents on the web makes the usage of meta-information more cumbersome than anticipated hence frequently loosing tracking capabilities.

Attempts had been done in the HTML world to find a certain rule for the Meta-information section but the presence of many method to encode the same information confuse publication artists of different levels and sectors of the industry, causing them to change the rules to what they understand of it.

In summary, there is a very high probability (90% of the time) that Meta-information is going to be destroyed along the production chain by other software.

Another problem associated with the usage of Meta-information is the frequent lack of conceptual capability to give additional information regarding the document content. It is frequently estimated that Meta-information is very separated from content because it is aimed at very different purpose. Therefore, information like geometry of a document, positioning, cropping or even final pagination is typically not properly encoded and decoded.

Therefore, there is a need for a system and method which allow for quickly tracking a document embedded within a publication without destroying or altering the content/shape of the document while increasing the probability that the information carried on across production an even across media keep the cargo message intact.

SUMMARY

The common denominator of all publishing software is the document content itself. Therefore, the text and the way it is written are by essence the most respected components of a document. Accordingly, the present embodiments incorporate a mark in the text, the mark embedding a message in the glyph thereof. In an embodiment, the message is barely noticeable or even completely invisible for screen display as well as for print, while at the same time remaining in a state allowing analysis. In a further embodiment, the message to imbed may not be coded as text content, but as a non marking text which has a rather natural but mandatory linked element, such as text graphical representation under specific conditions.

The present embodiments transform an electronic document into a traceable electronic document. The method may include transforming a message (number, letter, character, symbol, or any combination thereof) into a geometrical shape (a mark) and adding said geometrical shape into the document at a specific location within the borders/center of the electronic document. The message may be used as an ID to identify and track the electronic document within the publication based on the geometrical shape of the mark.

In one aspect, there is provided a method for tracing an electronic document within a publication, the method comprising: receiving a message to associate with the electronic document; encoding a binary representation of the message in a glyph of a mark, including drawing a specific geometrical shape for each bit of the binary representation within the glyph of the mark; adding the mark at a specific place within the electronic document to create a traceable document having the message as an identification within the publication.

In one embodiment, the method further comprises generating the message from the electronic document. For example, the message encoded in the mark may contain information gathered from analysis of the document itself. In the present embodiment, the method may further comprise analyzing the document; extracting information pertaining to the electronic document including at least one of: document size, name of author, clip path, production information, margin, relationship between marks; and incorporating one or more of the information in the message.

In a further embodiment, receiving a message comprises one of receiving the message from a user; and receiving the message from an automatic message generator.

In yet another embodiment, the method further comprises providing the mark in a phantom document at a specific location with respect to borders and/or center of the phantom document.

In another embodiment, the phantom document has a rectangular shape, the method further comprising: providing two marks at opposite corners of the phantom document; stretching the phantom document over the electronic document to delimit diagonal borders of the electronic document.

In a further embodiment, the method further comprises stretching the phantom document over the document.

In yet another embodiment, the method is further comprising searching for an unused character in the electronic document, and providing the mark in the font of the unused character.

In another embodiment, the method further comprises providing the mark in the font of a used character.

In a further embodiment, the method further comprises further comprising providing a detour from a line defining a periphery of the font to include the mark within the glyph of the existing character.

In yet another embodiment, the method further comprises providing a beacon having a unique geometrical shape within the glyph of the mark to flag the existence of the message when the publication is scanned.

In another embodiment, the method further comprises providing the beacon within the glyph of the mark at least before the message.

In a further embodiment, the beacon comprises a start and an end, the method further comprising: providing the start before the message and providing the end after the message.

In yet another embodiment, the geometrical shape of the beacon is different from the geometrical shape representing the each bit of the unique message.

In another embodiment, the method further comprises mapping the mark in the phantom document to the space or tab characters for avoiding text alterations if a font description of the mark is removed throughout the publication process.

In a further embodiment, the method comprises incorporating the traceable document within the publication. In yet another embodiment, the method further comprises implementing a scanner module comprising a hook for tracking the traceable document within the publication based on the geometrical shapes representing the binary representation of the message embedded in the mark.

In another embodiment, the method further comprises electronically processing the publication using an interpreter compatible with a format of the publication.

In a further embodiment, the method further comprises fetching, from the mark, positional information of the electronic document within the publication, the positional information including at least one of: position in page, page size, clip path, current color, and x/y ratio.

In yet another embodiment, the method further comprises providing the hook in the form of a library for PostScript, and a plug-in or interception to drawing library for other formats.

In another embodiment, the mark has substantially the same color as its background to make it invisible to the user.

In a further embodiment, the method further comprises embedding said mark in a new font having a unique name. The method may comprise de-imbedding said font from said document and re-instating said font at decoding time. It is also possible to provide said new font at a remote site.

In another aspect, there is provided computer having access to computer instructions for implementing the method described above.

In a further aspect, there is provided apparatus for tracing an electronic document within a publication, the apparatus comprising: a mark generation module for generating a mark having encoded in the glyph thereof a plurality of geometrical shapes representing a binary representation of a message; a document tracing module for adding the mark to the electronic document, for generating a traceable document having the message as an identification within the publication.

In one embodiment, the apparatus further comprises a document analyzer for analyzing the electronic document and extracting information pertaining to the electronic document including at least one of: document size, name of author, clip path, production information, margin, relationship between marks; and a message generator for incorporating at least one of the information in the message.

In another embodiment, the mark is provided at a specific location with respect to borders and/or center of the electronic document.

In a further embodiment, the mark is provided is provided in a phantom document which is adapted to be stretched over the electronic document to generate a traceable document, wherein the mark is provided at a specific location with respect to the borders and/or center of the traceable document.

In yet another embodiment, the phantom document is rectangular and includes two marks provided at opposite corners thereof.

In another embodiment, the geometrical shapes defining the mark includes a plurality of cells overlaid beside each other, each cell representing one of logic 0 and logic 1 of the binary representation of the message.

In a further embodiment, the mark has the shape of a rectangle or an arc.

In yet another embodiment, the apparatus is further comprising a scanner module for tracking the traceable document within the publication based on the geometrical shapes representing the message.

In yet another aspect, there is provided an apparatus for generating a phantom document for use in tracing electronic documents within a publication, the apparatus comprising: a mark generation module for generating a mark having encoded in the glyph thereof a plurality of geometrical shapes representing a binary representation of a message; a phantom document generation module for generating a phantom document having the mark provided at a specific location with respect to borders and/or center of the phantom document.

In one embodiment, the phantom document is adapted to be stretched over the electronic document to generate a traceable document having the message as an identification within the publication.

In another aspect, there is provided a method for generating phantom documents for use in tracing electronic documents within a publication, the method comprising: receiving a message; encoding a binary representation of the message in a glyph of a mark, including drawing a specific geometrical shape for each bit of the binary representation within the glyph of the mark; generating a phantom document having the mark provided at a specific location with respect to the borders and/or center of the phantom document.

In a further aspect, there is provided a method for transforming an electronic document to a traceable electronic document which may be traced within a publication, the system comprising: transforming a message into a mark including drawing within a glyph of the mark, a specific geometrical shape for each bit of a binary representation of the message; merging the mark into the electronic document.

In one embodiment, the method is further comprising providing the mark at a specific location within the borders and/or center of the electronic document.

In yet another aspect, there is provided a system for transforming an electronic document to a traceable electronic document, the system comprising: a mark generation module for generating a mark having encoded in the glyph thereof a plurality of geometrical shapes representing a binary representation of a message; a transformation module for merging the mark into the electronic document for transforming the electronic document into a traceable electronic document which may be traced within a publication.

In one embodiment, the transformation module provides the mark at a specific location within the borders and/or center of the electronic document.

The following terms are defined below:

Publication

A publication is a set of at least one page. Each page is made of at least one document. Examples of publications include but are not limited to books, magazines, HTML pages, internal documents, etc. Example of publication file format are Microsoft DOC, Microsoft XPS, Open Office ODS, Adobe PS, PDF or EPSF, W3C, HTML, SWF containers etc.

Document

A document is a piece of communication including at least one of graphics, text, images or any combination thereof. A document can be an image, a paragraph, an advertisement etc. and may have any size and even irregular contour. For example an advertisement shaped as a waving flag that are supposed to be surrounded by editorial text. Example of Document file format are Microsoft DOC, Microsoft XPS, Open Office ODS, Adobe PS, jpg, tiff, PDF or EPSF, W3C a HTML or SWF, etc. An Example of a document includes: an ad in a newspaper.

Subdocument

A subdocument is a document which is part of another document. This is more a hierarchical identification than a classification. Typically, the file format of a subdocument is the same as that of the document.

Page

A page is the basic reader element. It may contain a main content qualified as editorial, and may contain advertisement. The editorial sections as well as the advertisements parts are considered "documents" within the page. It may happen that a document is across more than one page.

Mark

A mark (aka Seal) is a geometrical shape including regular and irregular e.g. rectangle, arc, circle etc. In the present embodiments the mark includes a message embedded therein. The message may be used as a unique identification to track the document within a publication. Embodiments of the present invention add and retrieve marks when imbedded within a document which is provided in a publication.

Glyph

The glyph is the graphical representation of a character. For example: B *B* ℬ represents different glyphs of the character "B". Historically the glyph was assimilated as the character it graphically displays. The word glyph is frequently replaced by the word "character", but computers have allowed far greater flexibility in the way a character is drawn and allowed to establish a flexible relation between the character code and the set of drawings, called glyphs required to print it. By extension, this is the set of graphical operations that are necessary to render the character aspect in raster using typically a set of path made of vectors or curves.

Font

A font is a build collections of glyphs and an associative machinery to declare which glyph should be considered for rendering when a specific character code is asked.

Outlines

Hereafter an outline designate a character but not as a character code inception but rather as a set of shapes that outlines the character to draw it as it is expected to look. Such description of letters is not editable unless seen as a set of curves filled with a color or textures. There is an artistical reason to convert a glyph of a character to an outline, for example, when dealing with a logo, a trademark, or the like. There are also technical reasons due to the difficulties to apply an aesthetical distortion asked by an artist on text if text is still a character from a font. Then, software manufacturers may internally take decision to convert the associated glyph to an outline or drawing without warning. The present embodiments respect this transformation by adding an additional adaptation of the decoding for this case, this is explained further.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 1a to 1d illustrate the different stages of creating a traceable document within a publication, in accordance with an embodiment;

FIG. 8a is an example of a subdocument representing a phantom document as EPSF using type 3 postscript font;

FIG. 8b is an example of a subdocument representing a phantom document as SVG that can be referenced in HTML;

FIG. 9a includes the results of tracking a mark where the glyph was converted to outlines in a document;

FIG. 9b illustrates the result of tracking a mark where the glyph is made available directly from the font glyph bank in a document that includes editable text;

It will be noted that throughout the appended drawings, like features are identified by like reference numerals.

DETAILED DESCRIPTION

Figure 1E:
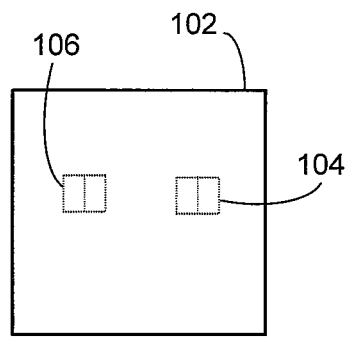
FIGS. 1e and 1f illustrate examples of phantom documents in which the marks are provided at regions other than the corners of the phantom document.

The present embodiments describe a system and method for tracing an electronic document within a publication. A message is associated to the document as a unique identification thereof. The binary representation of the message is encoded as geometrical shapes in the glyph representation of specifically chosen character. At least one specific character is associated with this glyph by the creation or modification of a specific font. The font is used at least once with at least one specific character within a mark. So that finally a mark doesn't contain the message as an explicit text but just as a simple text made of single character that references a tailored made glyph. The message itself is encoded in the glyph of a font used by the mark as a group of geometrical shapes arranged in a way that defines a stream of bits, wherein the alternation of aspects can be recognized and decoded by an electronic processing of the document.

First Embodiment of Implementation

In the first embodiment of implementation, the mark is typically integrated by the artist in the document prior to its delivery by the artist. Very few information can be prepared because of inherent prior delivery of marks. However, the position of the mark once in the document remains traceable. It is then possible to set the marks at specific locations and later at scanning time, report these positions as well as the message part like the ID for tracking the document geometries.

To help inserting theses predefined message marks in a document, the marks can be supplied in a subdocument aimed at easing the insertion by the artist of at least one marks and preferably at least 2 marks. This is achieved through the usage of a document delivered prior to design and containing the set of mark. This document is called the phantom document.

The phantom document defines a stretchable geometrical shape which may be dragged and stretched over the document, making the document traceable within the publication. The mark or set of marks are provided at a specific location with respect to the borders of the document. Preferably, the phantom document defines a rectangle and includes two marks at opposite corners of the rectangle. This process uses the phantom document as a support for theses marks, set at specifics positions.

The traceable document thus created is added to the publication. When there is a reason to track the document, the publication is sent to an electronic scanner module implementing a hook. The hook searches for the geometrical shapes representing the message in the mark. When found, the mark trigger the hook to interrogate the drawing scanner about the position of the mark at the moment it is found as well as others kind of intelligence that can be reported from the page of the publication. This allows obtaining positional information about the document including position in page, page number, width, length, X/Y ratio etc.

FIGS. 1a to 1d illustrate the different stages of creating a traceable document within a publication, in accordance with an embodiment. FIG. 1a illustrates an example of a document to be included in a publication. For example, the document 100 may be one or a combination of: photo, text, graph, diagram etc. If the document 100 is not electronic it is possible to scan it in order to have an electronic copy thereof that may be manipulated using a computer.

The content of the message to imbed is of no importance relative to the process, and can even be extracted or patched from the document after the document is marked. Typically the message need to allow some tracking of the document, and may be used as an ID. The message may contain an ID that allows for obtaining a reference in a database of all pertaining information related to the subdocument or document. The ID part can be supplied typically from a database or generated as unique ID like the Uniform Resource Names (URNs) 16.char that can be later indexed.

FIG. 1b is an example of phantom document 102. The phantom document comprises two marks 104 and 106. The marks 104 and 106 may be included at opposite ends of the phantom document 102. The dimensions of the phantom document are adjustable, whereby, the phantom document 102 may be stretched and/or rotated to fit over the document 100. For example, if the document 100 is an ad provided by a certain company to an advertisement agency to publish it in a newspaper or on their website, a technician at the ad agency stretches the phantom document 102 over the ad document 100 to create a traceable document 108 as shown in FIG. 1c. The traceable document 108 is then placed in a page 110 of the publication, as shown in FIG. 1d.

In a variation of the first embodiment, this process may be automated by allowing a designer to submit their document once in a final format to a process that will open it and imbed the phantom document automatically with proper stretching, underneath all other sub document, eventually adjusting the color to the background, and searching for additional sizing information like what is defined as "TrimBox" (which is known to be the printed area left once margin (also called "bleed") part of the document is cut) in the PDF specification, or first <TABLE> or <DIV> operator in HTML, which is the viewable area by the reader.

While FIGS. 1a to 1d show the marks as being included in the top right and bottom left of the document 100, it is to be noted that the present embodiments are not limited to this scenario. The marks 104 and 106 may be used anywhere within the document as long as the user keeps track of their position with regard to the borders of the document.

As the name indicates, the phantom document 102 is a document that exists in the publication 110 without being visible to the human eye in order to avoid un-ease/confusion to the reader. In the first embodiment, the phantom document is automatically generated prior to design for use with publications. FIGS. 1b to 1d illustrate the marks 104 and 106 as being visible only for clarification purposes. However, it should be noted that the marks 104 and 106 have such small dimensions and colors that only an electronic scanner can detect them by interpreting the page description language of the publication, as will be described in further detail herein below.

Even though the phantom document may be stretched and/or rotated to fit over a document in the publication, positions of the marks are tracked very precisely to mark the boundary of the document as reference that the user can use to specify a geometrical call to the tracking process that happens later, without the burden of dealing with invisible characters. In an embodiment, the marks may be completely invisible and may be mapped to the "space" and "tab" as key character that anyway will call for the properly encoded message glyphs. This too will be described in further detail hereinafter.

Once incorporated into a document, the phantom document acts as a sub document.

Figure 1F:
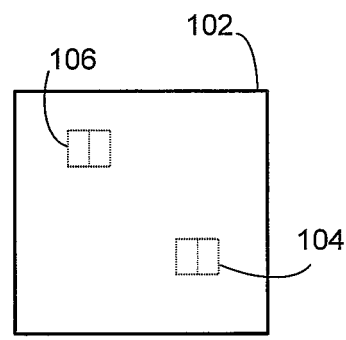
Figure 2A:
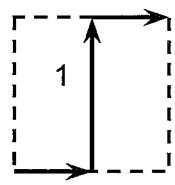
FIGS. 2a and 2b illustrate embodiments of cells designating logic 1.
Figure 2B:
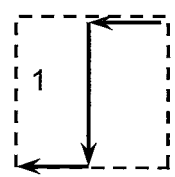
Figure 2C:
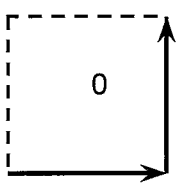
FIGS. 2c and 2d illustrate embodiments of cells designating logic 0.
Figure 2D:
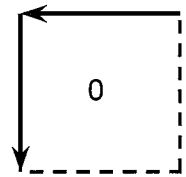

Another embodiment allows encoding the distances to the edge of the phantom document as a part of the message itself. In this case the marks doesn't have to be assumed as forced on diagonal corner of the phantom document, the decoding process can reconstruct the original phantom document edge using the imbedded information from the mark, then using the analyzed position of the mark at the moment they are found, the decoding process can deduce the stretching parameters that had been applied to the phantom document. This ultimately allows the same complete knowledge of final document size once in the publication. Examples of such implementation are shown in FIGS. 1e and 1f.

Second Embodiment of Implementation

In a second embodiment the marks are generated after the document is made available to the process. In this embodiment the additional information directly gathered from the document allows for enriching the message of the mark with document geometries, including irregular path of it, as well as information relevant to the meta-information class like author date etc. . . . . .

The benefits of the first embodiment are maintained. In addition, the second embodiment adds other capabilities to use the available elements of the document. The message may also include many sets of information like the "ArtBox" which is the area said to be defined by the minimal rectangle bounding the real content of the document, this allows to check visibility of document in the publication later using standardized criteria. This embodiment allows not only to retrieve information for coding in the message but also to re-use existing elements as part of the process. In particular, the message glyph can be injected in a font already imbedded in the document, this will explained in further detail hereinafter.

In the second embodiment, generation of the message is performed as follows: the document is sent to a document analyzer. The document analyzer analyzes the document and extracts information relating to the document such as the document size, author, relationship between marks, clip path, production information, margin etc. This information is then sent to a message generator to generate a message including some or all of the above information. The message is then encoded in the glyph of a character. This will be described in further detail herein below with reference to FIG. 14.

Generic Consideration about the Message in Glyph

As the message is encoded using a process that considers the full 8 bits, it allows storing binary information as well. This allows to use compression as well as signature method like a MD5 hashing, or encryption either symmetrical or asymmetrical. This processing of the message is non limitative and can be cumulative. All being usable before generation of the glyph encoding.

The capability to encode complex glyph is a requirement easily achieved by existing font formats which are designed to allow complex character to be encoded like Asian glyphs, so that the glyph itself can contain a huge message. If a single glyph is not sufficient to hold the full message the process can split the message amongst multiple glyphs that will also be associated to different specific characters may be used in the same mark.

A page or publication may include a plurality of sub-documents. In the main embodiment, the document may include a plurality of phantom sub-documents. This means that a plurality of set of marks can coexist within the same document each of them may have a different purpose. Either because the document itself is nesting another marked document (which may happens in the first and second embodiments) or for describing the variety of elements of the document like the bound of a copyrighted image, or a specific paragraph or word (These are features that are more applicable to the second embodiment).

In one embodiment, the user may embed a personalized message in the mark using a program that produces marks based on a message entered by a user. For example, to track an ad that belongs to the Pepsi® Company, it is possible to embed the binary representation of the word "Pepsi" in the glyph part of the mark.

When document is made available in full the content of the document can even be sealed or some element signed individually, then each information may be tailed in the message, like an md5 hashing of an image or even the text eventually with some element of position in order to secure its content.

Tracing the Document within the Publication

In an embodiment, the mark includes a unique message encoded at the bit level (logic 0 and logic 1) in the font/shape (glyph part) of the mark. The message may be entered by the user or may be generated by a computer and/or stored in a database. The message could be a character, number, etc. In the present embodiments, the mark is a geometrical shape that could be regular or irregular that embeds a unique message therein. The message is later associated with the document and may be used to trace the document within the publication using an electronic scanner or hook (software).

Figure 3A:
FIGS. 3a & 3b illustrate an embodiment in which the cell is provided in the shape of an arc, wherein an arc with half a swing designates logic 1 and an arc with full swing designates logic 1, respectively.
Figure 3B:
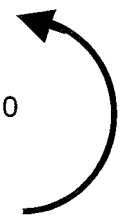

In a non-limiting example, the coding in geometrical shapes of the glyph description may have the shape of a rectangle as shown in FIG. 1b. In this example, each glyph includes one or more cells, and each cell includes a rectangle having a predefined width and height. In one example of implementation, a vertical line crossing the cell in the middle designate a logic 1 while a vertical on an edge of the cell designate a logic 0. This method is invariant of direction up or down which allow the next bit encoding to start from the previous bit corner without shifting current position, reducing requirement for the number of vectors to make the glyph path. The mark itself can be rotated however. The concept is still applicable once the baseline is known, which can be immediately deduced when analyzing the axis of the first line of the coding. Other examples of glyph geometrical coding are provided in FIGS. 3a & 3b which illustrate another embodiment in which the mark/cell is provided in the form of an arc. For example, an arc with half a swing designates logic 1 and an arc with full swing designates logic 0, respectively.

Figure 4A:
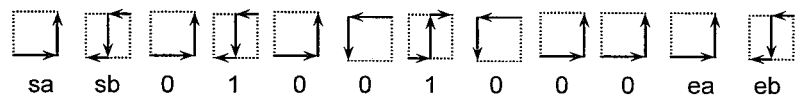
FIG. 4a illustrates the binary representation of the letter "H" in ASCII code (01001000) as a message.
Figure 4B:
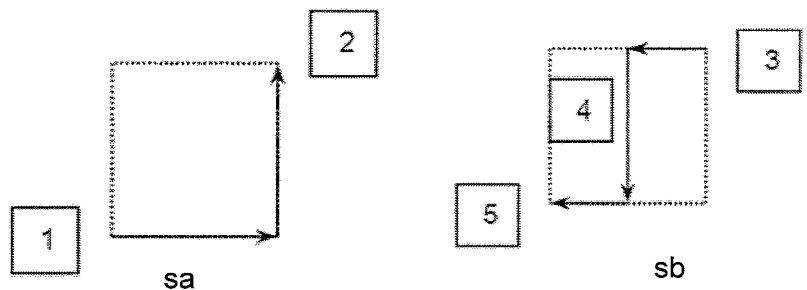
FIG. 4b illustrates the cells of an exemplary beacon, in accordance with an embodiment.

In a further embodiment, a beacon is used to flag the presence of a message. The beacon is at least provided at the beginning of the message. In one embodiment, the whole message is provided within the beginning and end of a beacon. In another embodiment, each byte of the message starts and ends with a beacon. The beacon is generally sufficient but it is also possible to use a specialized pattern provided at the beginning of the message. FIG. 4a illustrates the binary representation of the letter "H" in ASCII code (01001000) as a message. As shown in FIG. 4, the binary code of the message (01001000) is provided between a start beacon including two cells sa; sb and an end beacon also including two cells ea; eb. In this case, the message is the letter H in ASCII code. The cells of the beacon define a specific pattern that allows obtaining information about the size of the cells during the scanning process. Also, in case the document is rotated or stretched, the x/y ratio of the cell sizes may change. In this case the beacon cells may be used to establish the baseline for decoding the message. Therefore, because of their specific shape, the cells of the beacon may be used for scanning purposes. The catching mechanism (hook) expects a minimum of coherency on every cell drawing in particular the start beacon. FIG. 4b illustrates the cells of an exemplary beacon, in accordance with an embodiment. In the present example, the pattern for the different lines of the cells should sequentially comply with the following rules that can be:

1 & 2 need to be perpendicular;
3 should be 50% of 1;
4 should be identical to 2 but 180 deg direction;
5 should be identical to 3; and
final current point should be back to starting point.

Additionally for each byte: each following bit cell should only follow cell direction and sizes.

Failure of the cells to conform with the geometrical guidance will lead to rejection of consideration of the glyph as encoding a potential message. The pattern is searched for when the publication is scanned to flag the existence of a message. The progressive organization of the tests allows a fast rejection of less likely match.

Figure 5:
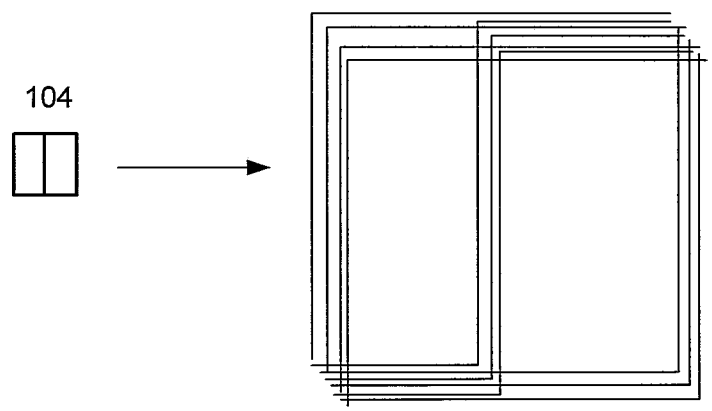
FIG. 5 illustrates an amplified version of a glyph of a mark including several cells overlaid at a certain distance from each other, and embedded in the glyph part of the font associated with a specific character used by the mark.

In order to embed the entire message in the mark, and at the same time reduce the size of the mark on the page, several cells (bits) are overlaid beside each other with the minimum possible distance there between, in accordance with an embodiment. An exemplary illustration of this embodiment is provided in FIG. 5. FIG. 5 illustrates an amplified version of a mark 104 including several cells overlaid at a certain distance from each other, and embedded in the glyph part of the mark.

As discussed above, the marks 104/106 may be used to provide positional information of the document within the publication page(s). In one example of implementation, the marks 104 and 106 are provided at opposite ends of the document 100 that needs to be tracked (see FIG. 1d) for marking the diagonal border of the document 100. The coordinates of each mark may be used to determine the position of the document and eventually any subdocument (left, right, middle, bottom, top, center, etc.) within the page, the size of the document (width and length), x/y ratio, and other information.

In a further embodiment, the marks 104 and 106 may be used anywhere within the document as long as the user keeps track of their position with regard to the borders of the document as discussed above and as illustrated in FIGS. 1e and 1f.

Figure 6A:
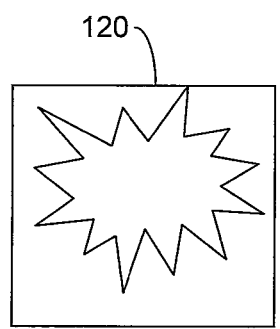
FIG. 6a illustrates an irregular shaped document.
Figure 6B:
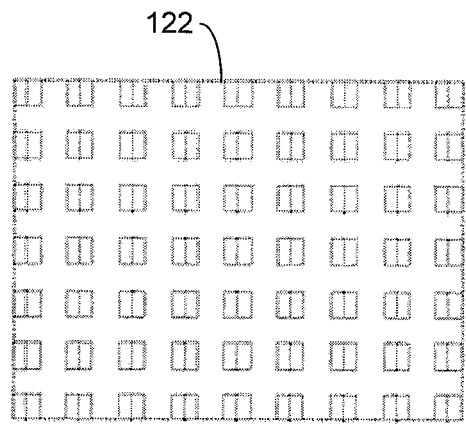
FIG. 6b illustrates a phantom document including a plurality of marks.
Figure 6C:
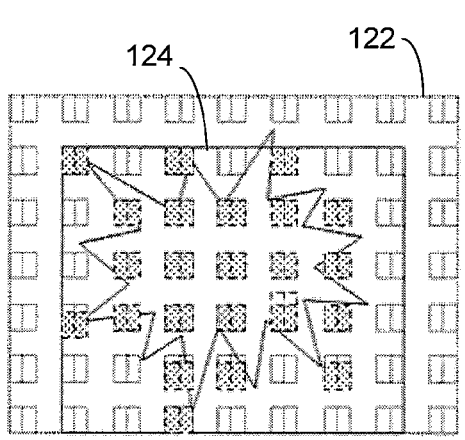
FIG. 6c illustrates a traceable document 124 including more than two marks.
Figure 6D:
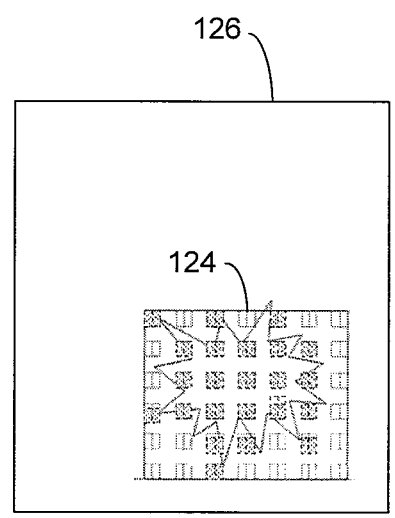
FIG. 6d illustrates the traceable irregular document of FIG. 6c in a publication page.

In cases where the document has an irregular shape, more than two marks may be used in the phantom document. FIG. 6a illustrates an irregular shaped document 120. FIG. 6b illustrates a phantom document including a plurality of marks. In the present document, the irregular document 120 is dragged over the phantom document 122 (or vice versa) to mark some or all of the corners of the irregular document 120. FIG. 6c illustrates a traceable document 124 including more than two marks, and FIG. 6d illustrates the irregular traceable document 124 in a publication page 126. As shown in the figures, the phantom document may be built as a grid of marks that allows for detection of visibility individually for each marks during the publication and scanning processes, this allow to establish a pattern of the document contour. Depending upon the granularity of the grid this coarse method suffices for many usages and still allows delivering to the artist a phantom document prior to design without any assumption or prior knowledge of the geometry of the final document contour.

An alternate method usable at least with the second embodiment is to use the decoding of the document geometry which is known prior to the mark generation to create a digest added to the mark message, for example tailed to the ID. This may include the information regarding mark expected own position relative to the document but also the distance to any fellow mark or even the found clipping path or a curved description of the odd shape to encode. The document and its marks do not need a link to a database, allowing a usage that is similar to per typical meta-information usage but without use of meta information.

Human Visibility of the Marks

As stated above, the mark should not interfere with other drawings or characters in the page. The mark may be designed to use graphical operators that have the minimal marking impact. In an embodiment, the mark contains only strokeable line and no fill-able path, so the drawing itself will be unnoticeable, the postscript rule for example will limit this to not more than a single pixel of the final rendering engine, typically 2400/inches in printing industry, and not more than 1/600 inches for most ink jet printers.

The mark also may be defaulted to a "white" if no overprint capabilities is allowed or to the lightest possible yellow (yellow being the least used color used when considering a document) for format allowing overprint capability (for light backgrounds). This is aimed at eliminating any interaction with other color planes than the yellow plane, keeping the background as much as it was as possible, or a dark yellow still overprinting when on dark background. However, the user, or in case of second embodiment the document analyzer, may very well recolor it to background color. Also the size of the drawing for the type can be very small and at worst only appears as a very tiny square with a middle line. Typically not bigger than a sentence final dot.

As the marks are found trough recognition and analysis of the glyph using an interpretation of absolutely every drawing in the publication (useful or not useful like if hidden by another object), the mark itself does not need to be visible (exposed) and can very well be placed in the document underneath any superimposed background like a full size white square. The mark may be completely invisible but may still be part of the description of the page. Retaining previous drawings along the Z order (the color planes being superposed one on top of the other along the Z axis) is a fundamental principle of the painting process used for Postscript PDF, SVG, SWF XPS to mention a few.

In another embodiment, as each cell sequence may perform a "return to 0,0" by construction of an alternation of displacement on the X axis. Then by patching properly the font, even once imbedded in the final publication, changing the drawing method from stroke to fill and by modifying the sign of the X displacement, a pattern may be created which is similar to a bar code that can easily be decoded optically.

Incorporation of the Phantom Document

In an embodiment, shape of the message glyph for the mark and the message to be embedded therein may be defined by a computer program provided as subdocument (phantom document) of the document that is to be traced within the publication. FIG. 8a is an example of subdocument representing a phantom document written in EPSF (Encapsulated PostScript File) using a type 3 postscript font. Reference numerals 902 to 909 designate the following:

---

902 size definition of the templates document, here 72 × 72 @ 72 dpi is 1 Dimension is arbitrarily chosen for their simplicity as this phantom document will not stay at this size but be stretched to proper dimension. However if the size is not encoded as distance between mark in the mark message itself, this dimension need to be known to evaluate distortion once in the publication.
903 Definition of bits drawing
904 First outline definition, encoding the message "HY0009" which incidentally is also the name of the key (for programming reasons only). No hash code is tailed, if this option is used then 4 extra Byte would be encoded also.
905 Second outline definition, encoding the message "HY0009T" the T is a convention, used to signal that is should be used for the character that will be put at Top Right of the doc. This is a pure programming choice.
906 The linking between the glyph and the character in the fond, here "space" and "tab" are the character of choice for these embodiments
907 End of font definition
908 A way to make the character very tiny, only draw with the lightest yellow, and even overprinted
909 The two marks are referenced using 2 characters using this font, each at special position (Bottom Left and edged to top right)

---

The program of FIG. 8a includes computer readable instructions which when executed produce a phantom document such as that shown in FIG. 1b with two marks 104 and 106. In FIG. 8a, 904 includes the instructions for drawing mark 106 which is the bottom left, and 905 includes the instructions for drawing mark 104 which is the top right. The mark drawn by 904 includes the message HY009, and that of 905 includes the message HY009T, the letter T designating TOP in this embodiment. The phantom document produced by the example herein is an Adobe EPSF but it may be a clipart with a True Type font designed in the same way, or any similar format In an embodiment, a mapping table is used to map the glyph to conventional characters of the text. For instance, as shown in FIG. 8a at 906, the glyph 104 and 106 are mapped to the space and tab characters with ( ) designating the space and (/011) designating the tab in EPSF. This helps avoiding content alteration if the glyph is replaced somewhere during the process. The space and tab character just ask drawing machinery to shift to another position without altering the content of the document by adding new characters. This case can happen unexpectedly as the publishing software may sometimes substitute the font, resulting in some font elimination. The impact of such action is considered as a major modification of the document that leads to a declaration that the document had been tampered with. If such event happens, then most likely the font used for the single char text of the mark from the phantom document will be replaced typically by a default font like "courier", and the mark would lose its purpose until the font is restored. However, as the glyph 104 and 106 are mapped to the space and tab characters the mark remains invisible.

This font substitution can be provoked if the publishing process is known to be safe enough to respect the name given to the special font for the mark. Then font substitution is possible as long as a restoration process allow to re-imbed it either before or during the analysis done by the scanning process described further.

FIG. 8b is another example of a subdocument representing a phantom document written in SVG (Scalable Vector Graphics) that can be referenced in HTML. Reference numerals 910 to 915 designate the following:

---

| | |
|---|---|
| 911 | Name definition, here a Unique ID is made for this font. |
| 912 | SVG encoding of the message using same cell convention, as FIGS. 2a to 2d. Coded drawing is the same as #904 |
| 913 | Same as #905 but in SVG format. |
| 914 & 915 | Call to the glyph as a definition of character |

---

Figures 8C, 9:
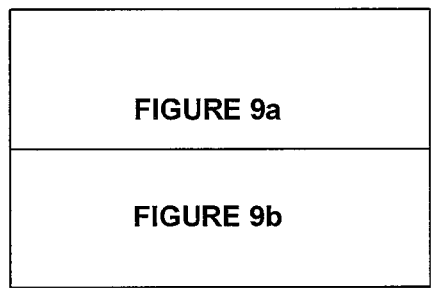
FIG. 8c is an example of a subdocument representing a phantom mark where the font with its glyph message are defined at a remote site.
FIG. 9 illustrates an exemplary scanner report in XML from a single page publication, FIG. 9 being the superposition of FIGS. 9a and 9b.

FIG. 8c is another example of a subdocument representing a phantom document as CSS (cascading style sheet) that can be used in an HTML page where the font is defined at a remote site.

This embodiment may be applied when the font itself is not always imbedded as part of the document. In this case, the font with the special mark just needs to be made available before final decoding of the publication. This is a case where font can be replaced on purpose, this is without any drawing consequences as the chosen characters for the text in the mark have no display for most known default font, and as long as the font name is unique the replacement is easy to setback by reinstating the proper font at rendering time. This allows fonts with the special glyph to carry a huge payload without requiring the document to hold it along the production chain.

In a preferred embodiment, the marks 104/106 defined in the phantom document may be added to the document 100 that needs to be traced as illustrated in FIGS. 1a to 1d. This embodiment applies to documents of any nature with or without text. However, for documents which are known to include editable text, further methods may be applied for incorporating the marks in the document.

For instance, it is possible to use an existing font by enriching its existing set of glyphs. Care is taken to use a non-existing description in order to avoid perturbation of the final document. In particular, the document font set may be scanned (for example by a process identical to the hook put on the interpreter of the PDL) to find a font already used (which at least one of his character is used in the text, otherwise risk exist that the font will legitimately be removed by a publishing software during the publishing process). This font is candidate for enrichment if it exhibits unused entries (characters that are not mapped to any glyph, or character that are known as being unused in the document). This is very likely to succeed most of the time because there is very low chance that each and every character of every font is used in a single document (there is 256 characters in ASCII and 64K characters allowed in Unicode iso-8859-1 or UTF8).

Figure 7A:
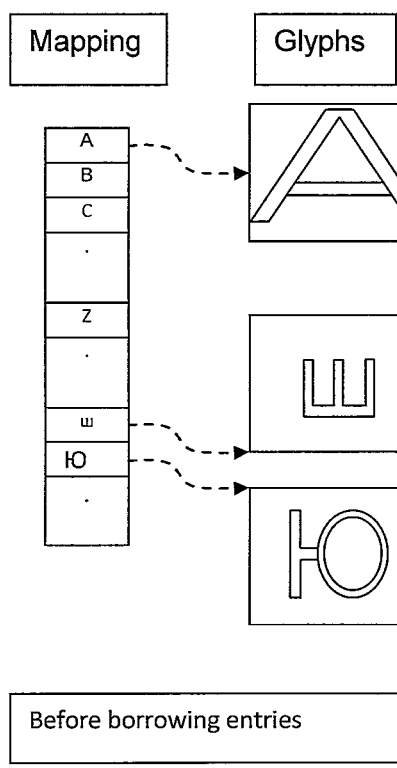
FIG. 7a illustrates a mapping table showing the characters and their glyph representations before borrowing unused entries.
Figure 7B:
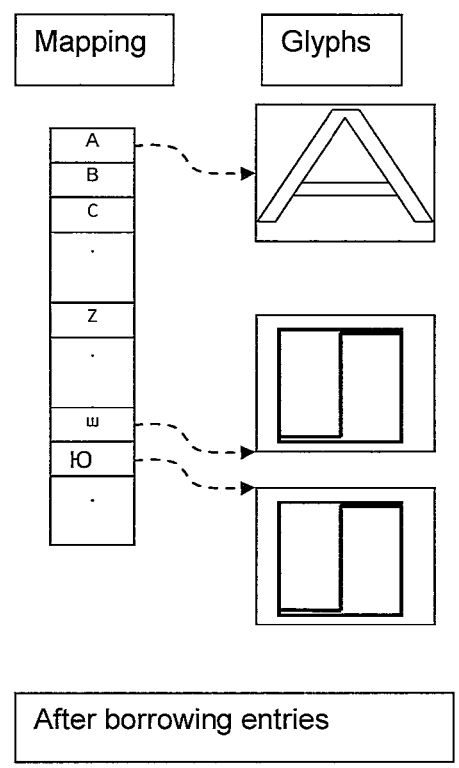
FIG. 7b illustrates a mapping table showing the characters and their glyph representations after borrowing unused entries.

Accordingly, the process then looks in every imbedded font and searches for and selects two unused entries that will be borrowed and adds the glyph like the one used for mark 104/106 to the existing font glyph set. For example, " " and " ю " are part of the Cyrillic section of the well-known Arial font that are rarely used in many text. It is then possible to use these characters to include the marks 104/106 in the glyph part of the characters. FIG. 7a illustrates a mapping table showing the characters and their glyph representations before borrowing unused entries, and FIG. 7b illustrates a mapping table showing the characters and their glyph representations after borrowing unused entries.

Figure 7C:
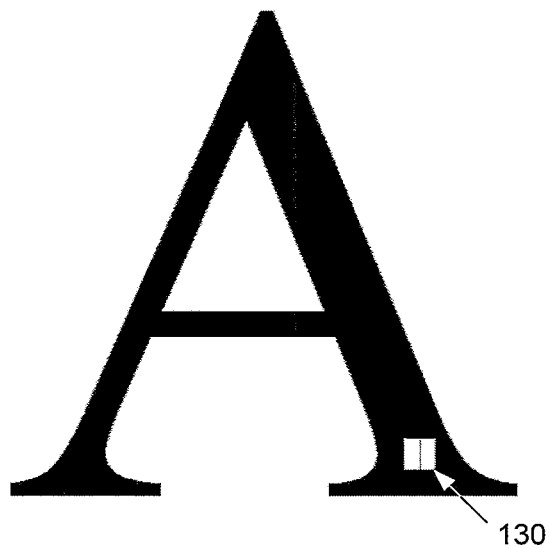
FIG. 7c illustrates an example of a mark included in the glyph part of the character A.
Figure 7D:
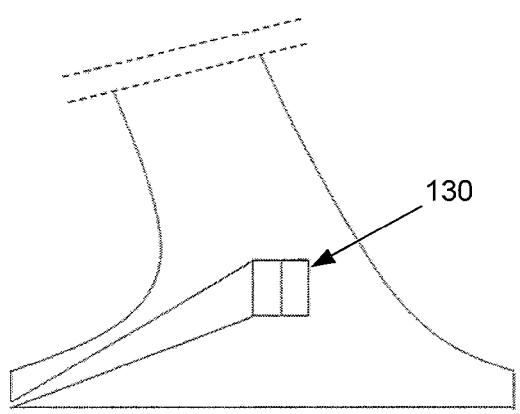
FIG. 7d illustrates an example of incorporating the mark on the path of an existing font making the mark virtually invisible.

In yet a further embodiment, it is possible to use the existing characters glyph of a font really in use in the body text to include the message glyph outline within the existing glyph associated with a character. FIG. 7c illustrates an example of a message glyph of a mark included in the original glyph part of character "A". It should be noted that the message glyph 130 is only shown in white to contrast it with the font color so that the reader can see it. However, in real life implementations the message glyph will automatically default drawing color to the one originally chosen for the rest of the character so as to only be detected by a scanner and not by a human eye. FIG. 7d illustrates an example of incorporating the mark on the path of an existing font making the mark virtually invisible. The mark may be added within the glyph and on the path of the existing line, making a detour from the existing path to include the mark within the glyph of the character. Some care must be taken to either create a new path under the existing glyph path or to be sure that the edge of the message glyph addition will be considered for rendering as being of the same color as the character, the message glyph addition may be then tailed with a "fill" operator for safety. The mark may be included anywhere in the glyph part of the character and in any character in the text, including dots, commas, etc.

In another embodiment, patched font can be delivered in advance with such message glyph containing for example an ID or the user name, added on all characters and delivered it to the user for usage as an ordinary font. When such delivery needs to be done prior to incorporation, it may be necessary to incorporate the message glyph to every character of the original glyphs set to be sure that at least one character will exhibit the message glyph during decoding. Because this process is done before font usage, it is unknown which character will be used by the artist. Most current format for font encoding mechanism allow to create a simple way to make it generic by use of a procedural approach, avoiding the penalty of multiplying the message glyph add-on detour to every original glyph.

Retrieving Process and Detection of the Phantom Document/Marks.

When there is reason to retrieve the information pertaining to the document in the publication, for example to search for a document or obtain positional information or otherwise about the document, the publication file is sent to an electronic scanner module. The goal of the scanning is to retrieve the message embedded in the marks and also as many possible information regarding the context where the mark was used including placement on the page.

All electronic publication formats require a renderer to convert the publication to pixels. The renderer imbeds an interpreter that takes the Page Description Language and arranges the drawing in a format compatible with the internal drawing machinery. The interpreter can be crude (HTML, even SVG can be qualifier as such because very linear in the approach) or sophisticated (PS, PDF, SWF which allow complex procedural call). The scanner module may receive and process the final publication through an interpreter compatible with the publication format, but may also do its interception work even if publication is printed then printing drivers for printing format like PostScript should do proper font conversion for font and associated glyph or simply "prints" the publication to a PostScript interpreter.

In the present embodiments, the interpreter is equipped with a special hook in the form of a library for PostScript like format or a plug-in for other formats. The hook is for catching the message of the mark either as drawing if font had been converted to outlines, or as glyph if the text aspect of the document stays respected. When a glyph or drawing is recognized with a certain aspect, then the hook catches the current context to fetch positional information. The information is collected and transmitted to another process external to the apparatus for processing. The transmission may be a simple XML file that will enter a database allowing reporting operational information about the document within the submitted publication.

The scanner module could employ a library based interceptor for language based renderers such as Postscript, PDF, etc. For example, the library based interceptor could use a library of code written in Postscript specialized to interpret glyph drawing. For formats like XPS, SVG or even HTML, the process is not done using an exposed process, but rather as an imbricate part of the rendering engine within the browser. In an embodiment, a special design code is created that allows for grabbing rendering information and then detecting marks trough exactly the same process. This may be done through a plug-in mechanism or through customization of available source code or trough a redirection of a library in charge of plotting the character glyph for example a Microsoft WIN32 GDI DLL).

In many cases, the software used for the design process allows incorporating the Postscript font or TrueType font, and also allows printing any publication or document. Page Description Language like PostScript and printer drivers respect the font description and convert it, if necessary, transmitting the glyph without incidental modification. Then, even if the software does not save the document in a supported format for the scanner, the publication can still be analyzed. For example, by simply printing the publication to a supported renderer, for example a PostScript printer, the message will be converted from its native format and incorporated in the Postscript code. It becomes a universal solution for all formats that support drawings. This process has been successful even with XML, SVG XPS, and HTML documents, or even in cross combination like using a natively coded mark in SVG description as FIG. 8b to a postscript printer, and for environment that can be associated with the art of publishing as well as CAD or architecture drawings that also use font for plan, and allow the printing of it.

In the library based interceptor, it should be noted that the library (implementing the hook) may reside in the interpreter part of the Raster Image processor (Rip) to perform two kinds of rendering: text rendering (to detect the special or enriched font using the beacon as a criteria) and line rendering or assimilated arc rendering (to directly detect a beacon embedded in a mark such as the mark 104 shown in FIG. 1b).

In the text rendering, the hook gradually searches the characters of the text, character by character, looking for the glyph of the each character. Then the process scans each glyph associated with the character to check that it would successfully go trough the gradual and progressive tests set, achieving the required minimal level of consistency for the beacon and the cells representing the message. If positive, then the character position at the moment the call is done will be reported as well as the associated glyph with its message. In case the character had been converted to an outline the hook intercepts lines drawing request and similarly searches the drawings for the pattern of a beacon, and then proceeds to the same checks if there is consistency in the rest of the bits (cells).

Once a full message is identified, the hook fetches the current position, page size, clip path, current color, etc. . . . of the document to report the results.

FIG. 9 illustrates an exemplary scanner report in XML from a single page publication. FIG. 9 is the superposition of FIGS. 9a and 9b. FIG. 9a includes the result of tracking a drawing type document, and FIG. 9b illustrates the result of tracking a document including editable text. Reference numerals 1001 to 1004 designate the following:

| | |
|---|---|
| 1001 | The page size as grabbed during drawing call. |
| 1002 | XML encoding of the message using same cell convention, as FIGS. 2a to 2d. Coded drawing is the same as #904 (And should be the same if used for printing a document in SVG as 912) |
| 1003 | An mark used with a graphical document (mark). The decoding of the cell is not done by the library but by the module that read the XML report. This allows for decreasing the impact on the hook/library, making it lighter. |
| 1004 | Another mark, in the same page, but at another place. This time, the mark is encoded in the glyph part of a character. The description is taken directly from the font glyph even before it is converted to a drawing. |

As the mark is included in the glyph of a character, the process benefits from the way every application in the production handles text. Text is not a heavy element. It requires no optimization within the page. In an embodiment, the process increases the text load essentially by only two characters by document.

The process can either be embedded in the same computer for local use, or as a client-server architecture where the marks are generated and imbedded in a phantom document on a server and/or on client machine. If the scanning part of the process is done on a central sever, the mark can be made of a unique id.

Figure 10:
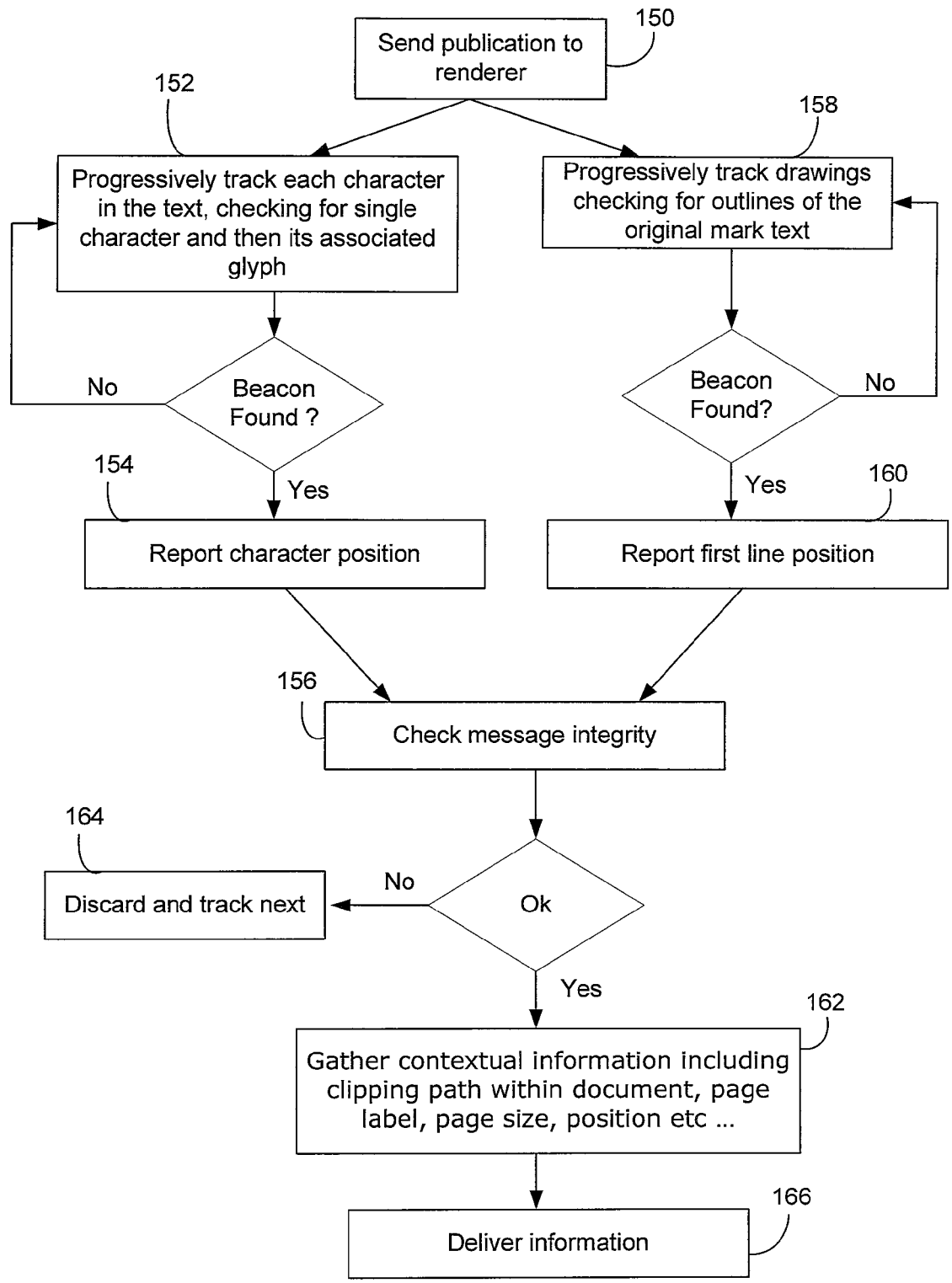
FIG. 10 is a flowchart illustrating a method for scanning a publication.

FIG. 10 is a flowchart illustrating a method for scanning a publication. The method begins at step 150 by sending the publication to a renderer. Steps 152 and 154 may be used to find the mark in documents that include editable text. In particular, step 152 includes tracking the text of the publication searching for the mark in the glyph of a character. If a beacon is found, the character position is reported at step 154. The message integrity is checked at step 156.

Steps 158 and 160 may be used to find the mark in documents that are of a drawing nature e.g. logo, outline, picture etc. At step 158 the process tracks the drawings progressively checking for a mark (see FIGS. 1a to 1d). When a beacon is found, the first line position of the beacon is reported at step 160. The process then proceeds to step 156. Steps 158 to 160 may be done before or in parallel to steps 152 to 154.

If the message integrity is verified, the process proceeds to step 162 to gather contextual information about the document including positional information, size, x/y ratio, color, font, page size, page label etc. If the message integrity is not verified, the process simply moves to track the next mark at step 164. After step 162, the process proceeds to step 166 to deliver the information.

Figure 11:
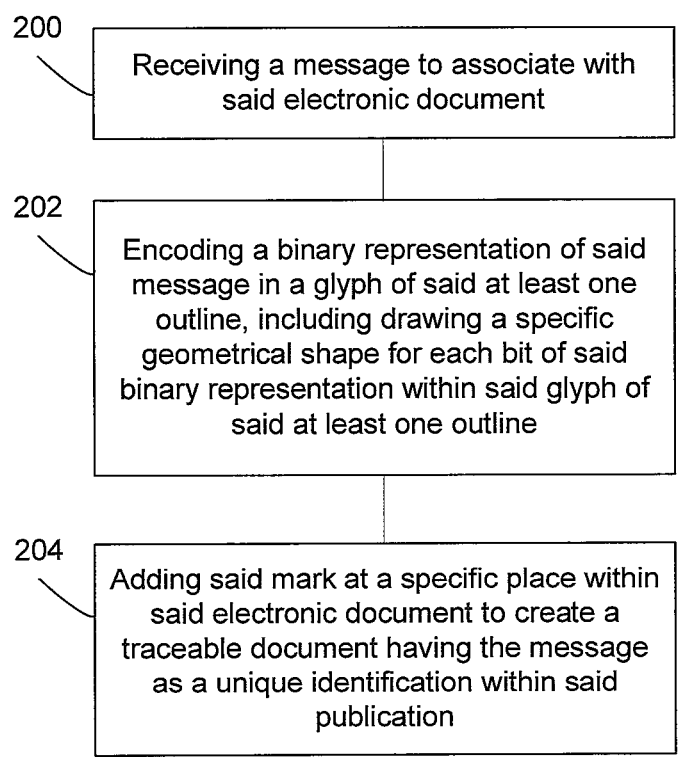
FIG. 11 is a flowchart illustrating a generic method for tracing an electronic document within a publication.

FIG. 11 is a flowchart illustrating a generic method for tracing an electronic document within a publication. At step 200, a message is received to associate with the electronic document. Step 202 comprises encoding a binary representation of the message in a glyph of the at least one outline, including drawing a specific geometrical shape for each bit of the binary representation within the glyph of the at least one outline. Step 204 includes adding the mark at a specific place within the electronic document to create a traceable document having the message as a unique identification within the publication.

Figure 12:
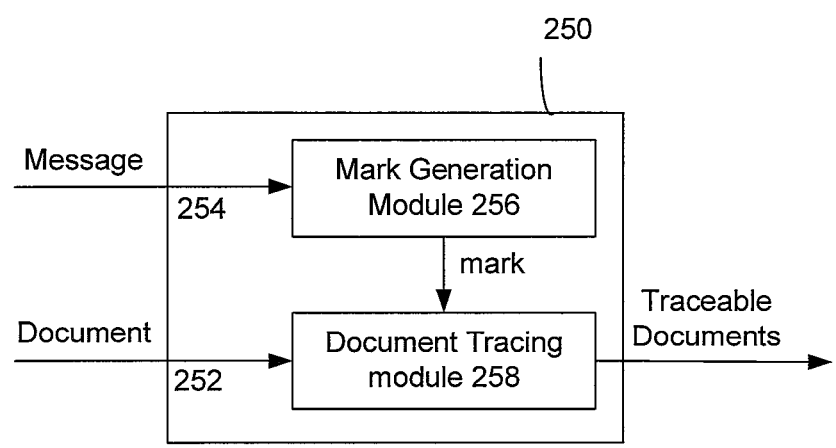
FIG. 12 is a block diagram of an exemplary system for generating traceable documents in a publication.

FIG. 12 is a block diagram of an exemplary system for generating traceable documents in a publication, in accordance with the first embodiment of implementation. As shown in FIG. 12, the system 250 includes a first input 252 for receiving the document that needs to be traced, and a second input 254 for receiving a unique message. The unique message may be entered by the user, may be generated by a computer (e.g. the message may be randomized or generated like a URN) and/or stored in a database, or may be generated based on the content of the document itself. A mark generation module 256 receives the message and generates a mark having encoded in the glyph thereof geometrical shapes representing the binary format of the message. The mark produced by the mark generation module is sent to the document tracing module 258 to be added to the document that needs to be traced. In one embodiment, the document tracing module 258 may provide the mark in a phantom document which is adapted to be stretched over the electronic document to generate the traceable document.

Figure 13:
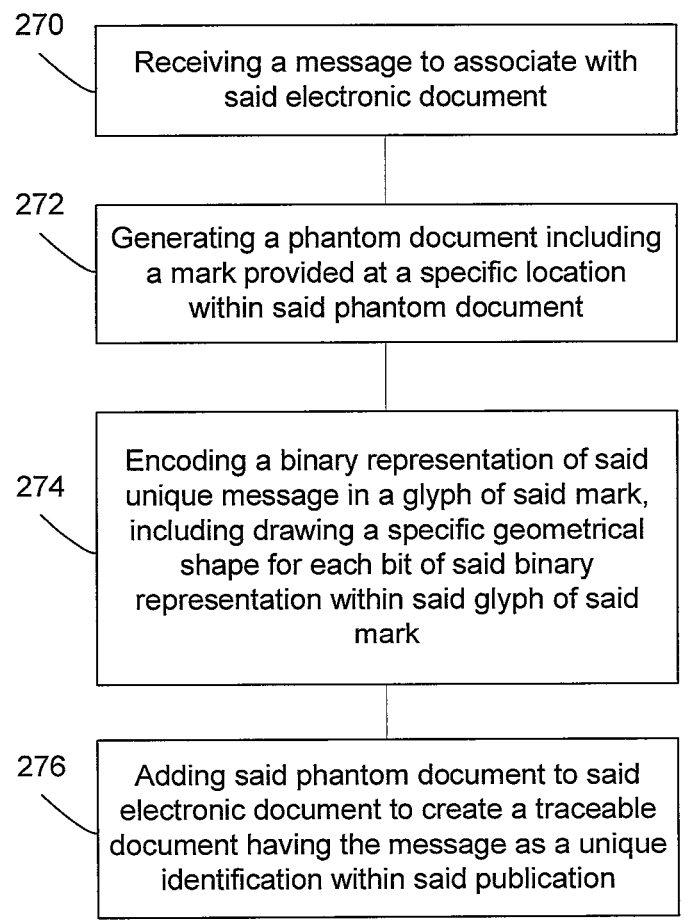
FIG. 13 is a flowchart illustrating a method for tracing an electronic document within a publication, in accordance with an embodiment.

FIG. 13 is a flowchart illustrating a method for tracing an electronic document within a publication, in accordance with the first embodiment. The method begins at step 270 by receiving a unique message to associate with the electronic document. Step 272 comprises generating a phantom document including at least one mark provided at a specific location within the phantom document. Step 274 comprises encoding a binary representation of the unique message in a glyph of the at least one mark, including drawing a specific geometrical shape for each bit of the binary representation within the glyph of the at least one mark. Step 276 comprises adding the phantom document to the electronic document to create a traceable document having the message as a unique identification within the publication.

Figure 14:
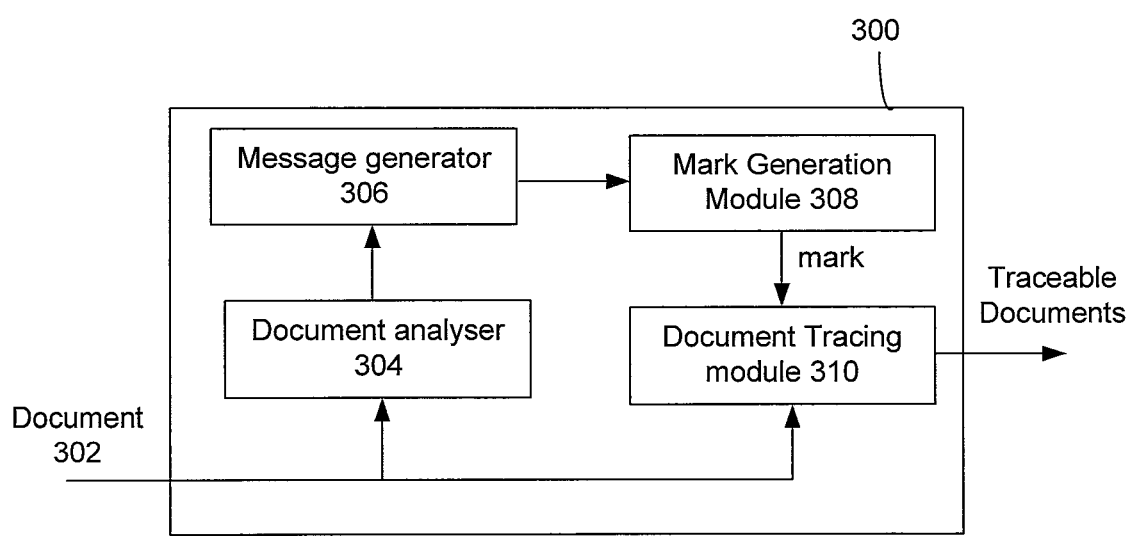
FIG. 14 is a block diagram of an exemplary system for generating traceable documents in a publication, in accordance with a second embodiment of implementation.

FIG. 14 is a block diagram of an exemplary system for generating traceable documents in a publication, in accordance with a second embodiment of implementation. As shown in FIG. 14, the system 300 receives as input, the document 302 that needs to be traced within the publication. The system 300 may be an automated system that does not require the user's intervention in entering a message or incorporating a phantom document over the document 302. A document analyzer 304 receives the document 302 and analyzes it to extract document intelligence information pertaining to the document including but not limited to: document size, author, clip path, production information, margin etc.

The information is then sent to a message generator 306. The message generator 306 generates a message including some or all of the information received by the document analyzer 304. The message thus generated is then sent to the mark generation module 308 to generate a mark having encoded in the glyph thereof geometrical shapes representing the binary format of the message. A document tracing module 310 receives the document 302 and incorporates the marks generated by the mark generation module 308 into the document at specific places to create a document having the message as a unique identification and additional imbedded geometric and document intelligence within the publication to produce a traceable document.

Figure 15:
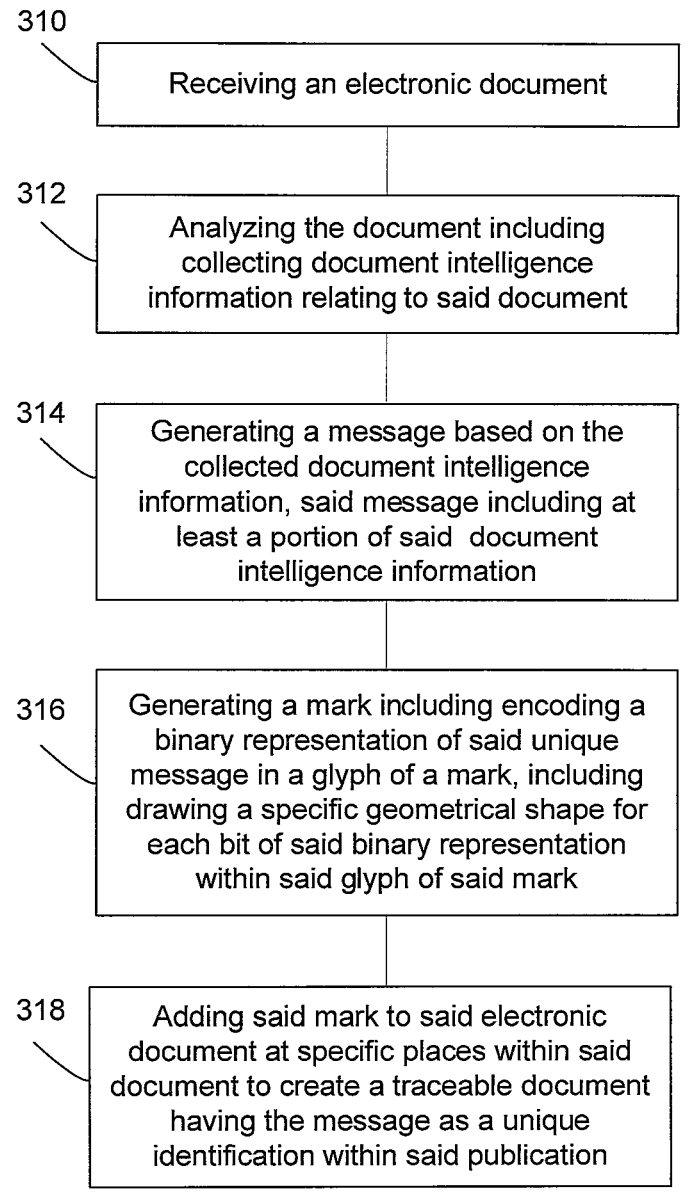
FIG. 15 is a flowchart of a method for tracing an electronic document in accordance with the second embodiment

FIG. 15 is a flowchart of a method for tracing an electronic document in accordance with the second embodiment. The method begins at step 310 by receiving the electronic document. Step 312 comprises analyzing the document and collecting document intelligence information relating to the document. Step 314 comprises generating a message based on the collected document intelligence information, the message including at least a portion of the document intelligence information. Step 314 comprises generating a message based on the collected document intelligence information, the message including at least a portion of the document intelligence information. Step 316 comprises generating a mark including encoding a binary representation of the unique message in a glyph of a mark, including drawing a specific geometrical shape for each bit of the binary representation within the glyph of the mark. Step 318 comprises adding the mark to the electronic document at specific places of the document to create a traceable document having the message as a unique identification within the publication.

Figure 16:
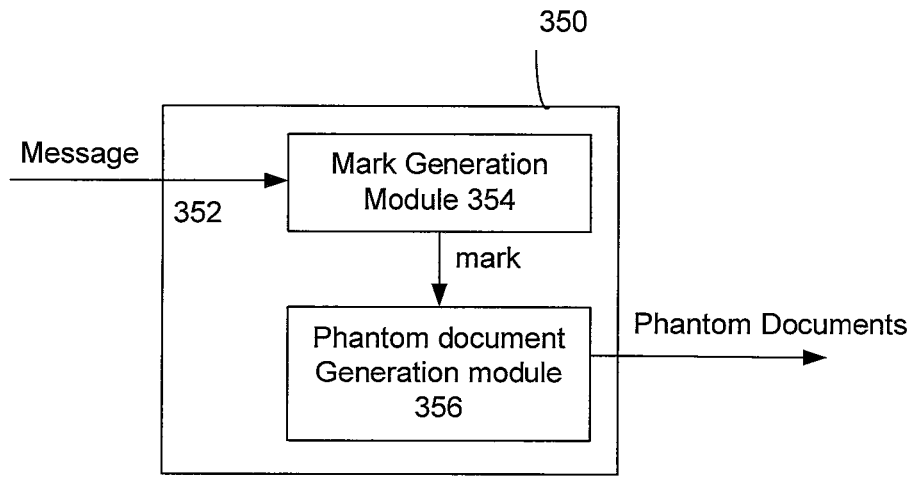
FIG. 16 is a block diagram of an exemplary system for generating phantom documents, in accordance with a further embodiment.

FIG. 16 is a block diagram of an exemplary system for generating phantom documents, in accordance with a further embodiment. As shown in FIG. 16, the system 350 includes an input 652 for receiving a message. The message may be entered by the user, generated by an automatic message generator (e.g. random generator) and/or stored in a database. A mark generation module 354 receives the message and generates a mark having encoded in the glyph thereof geometrical shapes representing the binary format of the message. The mark produced by the mark generation module is sent to the phantom document generation module 356. The phantom document generation module 356 incorporates the mark in a phantom document at a specific place within the borders and/or center of the phantom document. In an embodiment, the phantom document is adapted to overlap and/or stretch over an electronic document to create a traceable document having the message as an identification embedded in the mark.

Figure 17:
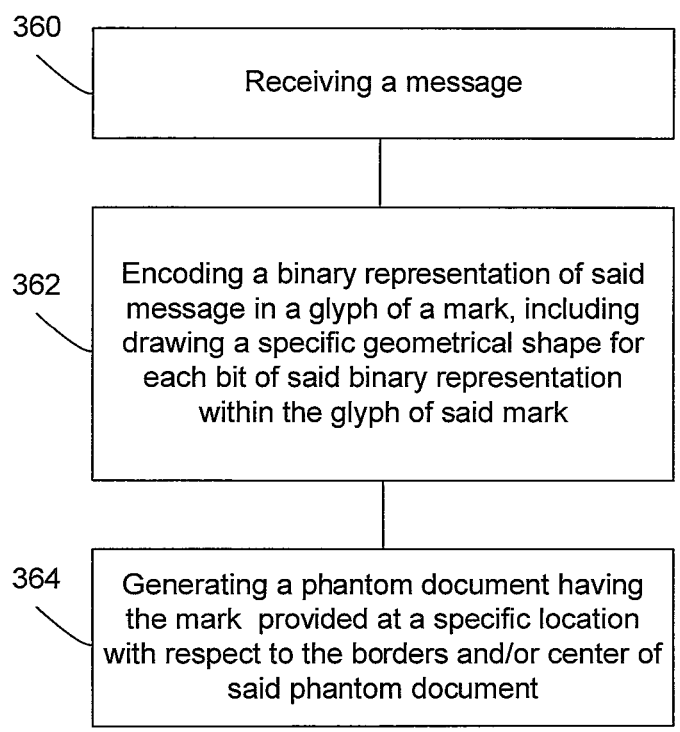
FIG. 17 is a flowchart for creating phantom documents for use in tracing electronic documents.

FIG. 17 is a flowchart for a method for creating phantom documents for use in tracing electronic documents. The method begins at step 360 by receiving a message. Step 362 comprises encoding a binary representation of the message in a glyph of a mark, including drawing a specific geometrical shape for each bit of the binary representation within the glyph of the mark. Step 364 comprises generating a phantom document having the mark provided at a specific location with respect to the borders and/or center of the phantom document. The phantom document thus generated may be stored in memory for later use. The phantom document may overlap and/or be stretched over the electronic document for creating a traceable document.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method for making electronic documents traceable within an electronic publication, said method comprising:
   receiving an electronic document having an electronic page description;
   receiving a message identifier to associate with the electronic document;
   transforming the message identifier into a binary format;
   modifying the electronic page description of the electronic document including adding drawing instructions in the electronic page description, the drawing instructions being configured to code each bit of the binary format as a geometrical shape, wherein the geometrical shapes of all the bits of the binary format define a mark, the drawing instructions being configured to cause the geometrical shapes to be at least one of: invisible at rendering and overlaid on top of each other.

2. The method of claim 1, further comprising:
   providing the geometrical shapes in small dimensions that are undetectable to the human eye.

3. The method of claim 1, further comprising:
   generating the message identifier from the electronic document;
   analyzing the electronic document;
   extracting information pertaining to the electronic document including at least one of: document size, name of author, clip path, production information, margin, relationship between marks; and
   incorporating one or more of the extracted information in the message identifier.

4. The method of claim 1, wherein receiving a message identifier comprises one of
   receiving the message identifier from a user; and
   receiving the message identifier from an automatic message generator.

5. The method of claim 4, further comprising:
   providing the mark in a phantom document at a specific location with respect to borders and/or center of the phantom document.

6. The method of claim 5, wherein the phantom document has a rectangular shape, the method further comprising:
providing two marks at opposite corners of the phantom document;
stretching the phantom document over the electronic document to delimit diagonal borders of the electronic document.

7. The method of claim 5, further comprising:
stretching the phantom document over the electronic document.

8. The method of claim 1, further comprising:
searching for an unused character in the electronic document, and providing the mark in a font of the unused character.

9. The method of claim 1, further comprising:
providing the mark in a font of a used character.

10. The method of claim 9, further comprising:
providing a detour from a line defining a periphery of the font to include the mark within a glyph of the used character.

11. The method of claim 1, further comprising:
providing a beacon having a unique geometrical shape within the mark to flag the existence of the message identifier during scanning.

12. The method of claim 11 further comprising:
providing the beacon within the mark at least before the message identifier.

13. The method of claim 12 wherein the beacon comprises a start and an end, the method further comprising:
providing the start before the message identifier and providing the end after the message identifier.

14. The method of claim 11 wherein the geometrical shape of the beacon is different from the geometrical shape representing said each bit of said unique message.

15. The method of claim 1, further comprising:
mapping the mark to the space or tab characters for avoiding reading misinterpretation if a font description of the mark is removed throughout the publication process.

16. The method of claim 1, further comprising:
incorporating the electronic document within the electronic publication.

17. The method of claim 16, further comprising:
implementing an electronic scanner module comprising a hook for tracking the electronic document within the publication based on the geometrical shapes representing the binary format of the message identifier.

18. The method of claim 17, further comprising:
electronically processing an electronic page description of the electronic publication using an interpreter compatible with a format of a page description language of the electronic publication.

19. The method of claim 17, further comprising:
fetching, from the mark, positional information of the electronic document within the electronic publication, the positional information including at least one of: position in page, page size, clip path, current color, and x/y ratio.

20. The method of claim 17, further comprising:
providing said hook in the form of a library for PostScript, a plug-in or interception to drawing library for other formats.

21. The method of claim 1, further comprising providing the geometrical shapes in a color that allows invisibility.

22. The method of claim 1, further comprising embedding the mark in a new font having a unique name.

23. The method of claim 22, further comprising de-imbedding the font from the electronic document and re-instating the font at final decoding of the electronic publication.

24. The method of claim 22, further comprising providing the new font at a remote site.

25. A computer having access to computer instructions for implementing the method of claim 1.

26. An apparatus comprising a processor having access to one or more programs for execution by the processor for making electronic documents traceable within an electronic publication, the apparatus comprising:
a mark generation module adapted to receive an electronic document having an electronic page description and a message identifier to associate with the electronic document, and generate for the message identifier drawing instructions for drawing a mark comprising a plurality of geometrical shapes, wherein each geometrical shape represents a bit of a binary format of the message identifier; the drawing instruction being configured to cause the geometrical shapes to be at least one of: invisible at rendering and overlaid on top of each other;
a document tracing module adapted to modify the electronic page description of the electronic document to add the drawing instructions to provide the mark at a given location within the electronic document.

27. The apparatus of claim 26, further comprising:
a document analyzer for analyzing the electronic document and extracting information pertaining to the electronic document including at least one of: document size, name of author, clip path, production information, margin, relationship between marks; and
a message generator for incorporating at least one of the extracted information in the message identifier.

28. The apparatus of claim 26, wherein the mark is provided at any user selected location with respect to borders and/or center of the electronic document.

29. The apparatus of claim 26, wherein the mark is provided in a phantom document which is adapted to be stretched over the electronic document to generate a traceable document, wherein the mark is provided at a known location with respect to the borders and/or center of said traceable document.

30. The apparatus of claim 29, wherein the phantom document is rectangular and includes two marks provided at opposite corners thereof.

31. The apparatus of claim 26, wherein the geometrical shapes overlap each other or partly overlap each other, each geometrical shape representing one of logic 0 and logic 1 of the binary format of the message identifier.

32. The apparatus of claim 26, wherein the mark has the shape of a rectangle or an arc.

33. The apparatus of claim 26, further comprising a scanner module for tracking the electronic document within the publication based on the geometrical shapes representing the message identifier.

34. A method for making electronic documents traceable within an electronic publication, said system comprising:
receiving an electronic document having an electronic page description;
transforming a message identifier associated with the electronic document into a binary format;
for each bit of the binary format, providing drawing instructions to draw a geometrical shape, wherein the geometrical shapes of all the bits define a mark, the drawing instructions being configured to cause the geometrical shapes to be at least one of: invisible at rendering and overlaid on top of each other;
modifying the electronic page description of the electronic document including adding the drawing instructions to provide the mark in the electronic document;

adding the electronic document to the electronic publication;

running a page description language interpreter on the electronic page description of the electronic publication to extract the geometrical shapes;

decoding the extracted geometrical shapes to re-construct the message identifier.

35. The method of claim 34, further comprising providing the mark at any user selected location within the electronic document.

36. A system comprising a processor having access to one or more programs for execution by the processor for transforming an electronic document to a traceable electronic document within an electronic publication, said system comprising:

a mark generation module adapted to receive a message identifier, and generate for the message identifier drawing instructions for drawing a mark comprising a plurality of geometrical shapes, wherein each geometrical shape represents a bit of a binary format of the message identifier, the drawing instructions being configured to cause the geometrical shapes to be at least one of: invisible at rendering and overlaid on top of each other;

a transformation module adapted to modify the electronic page description of the electronic document by adding the drawing instructions to provide the mark within the electronic document transforming the electronic document to a traceable electronic document;

an incorporation module adapted to incorporate the traceable electronic document in the electronic publication;

an electronic scanner module comprising a page description language interpreter adapted to interpret an electronic page description of the electronic publication to extract the geometrical shapes;

a decoder module adapted to decode the extracted geometrical shapes to re-construct the message identifier.

37. The system of claim 36, wherein the transformation module provides the mark at a known location within the borders and/or center of said electronic document.

38. The method of claim 1, further comprising providing the geometrical shapes underneath another drawn object to ensure invisibility.

39. The method of claim 1, further comprising adding the mark at any user selected location within the electronic document.

40. The apparatus of claim 26, wherein the geometrical shapes are at least one of: provided underneath another drawn object to ensure invisibility, and provided in colors that makes them invisible.

41. The method of claim 34, wherein the geometrical shapes are at least one of: provided underneath another drawn object to ensure invisibility, and provided in colors that makes them invisible.

42. The system of claim 36, wherein the geometrical shapes are at least one of: provided underneath another drawn object to ensure invisibility, and provided in colors that makes them invisible.

* * * * *